United States Patent
Kilic et al.

(10) Patent No.: US 8,269,976 B2
(45) Date of Patent: Sep. 18, 2012

(54) GYROSCOPE UTILIZING MEMS AND OPTICAL SENSING

(75) Inventors: Onur Kilic, Mountain View, CA (US); Michel J. F. Digonnet, Palo Alto, CA (US); Gordon S. Kino, Stanford, CA (US); Olav Solgaard, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 237 days.

(21) Appl. No.: 12/770,545

(22) Filed: Apr. 29, 2010

(65) Prior Publication Data
US 2010/0309474 A1 Dec. 9, 2010

Related U.S. Application Data

(60) Provisional application No. 61/174,969, filed on May 1, 2009.

(51) Int. Cl.
*G01C 19/72* (2006.01)
*G01C 19/00* (2006.01)
*G01B 9/02* (2006.01)
*G01P 9/00* (2006.01)
*G01P 15/14* (2006.01)

(52) U.S. Cl. ........................ 356/460; 356/480; 73/504.02
(58) Field of Classification Search .................. 356/460, 356/480, 482; 73/504.01, 504.02
See application file for complete search history.

(56) References Cited

U.S. PATENT DOCUMENTS

| | | | |
|---|---|---|---|
| 5,203,208 A | | 4/1993 | Bernstein |
| 5,831,166 A | * | 11/1998 | Kozuka et al. .................. 73/570 |
| 5,894,090 A | | 4/1999 | Tang et al. |
| 6,003,373 A | | 12/1999 | Moore et al. |
| 6,546,798 B1 | | 4/2003 | Waters et al. |
| 7,526,148 B2 | | 4/2009 | Kilic et al. |
| 7,630,589 B2 | | 12/2009 | Kilic et al. |
| 2007/0081165 A1 | * | 4/2007 | Kilic et al. .................... 356/477 |
| 2008/0034866 A1 | | 2/2008 | Kilic et al. |

FOREIGN PATENT DOCUMENTS

| | | |
|---|---|---|
| CN | 101 046 381 | 10/2007 |
| WO | WO 99/36788 | 7/1999 |

OTHER PUBLICATIONS

Annovazzi-Lodi, Valerio et al. "Optical Detection of the Coriolis Force on a Silicon Micromachined Gyorscope". Journal of Microelectromechanical Systems, vol. 12, No. 5, Oct. 2003, pp. 540-549.*

(Continued)

*Primary Examiner* — Michael A Lyons
(74) *Attorney, Agent, or Firm* — Knobbe, Martens, Olson & Bear LLP

(57) ABSTRACT

A gyroscope and a method of detecting rotation are provided. The gyroscope includes a structure configured to be driven to move about a drive axis. The structure is further configured to move about a sense axis in response to a Coriolis force generated by rotation of the structure about a rotational axis while moving about the drive axis. The gyroscope further includes an optical sensor system configured to optically measure movement of the structure about the sense axis. In certain embodiments, the gyroscope is a microelectromechanical system (MEMS) gyroscope.

37 Claims, 10 Drawing Sheets

OTHER PUBLICATIONS

Annovazzi-Lodi, Valerio et al. "Optical characterization of micro-electro-mechanical structures". Optical Micro- and Nanometrology in Manufacturing Technology, Proceedings of SPIE vol. 5458, 2004, pp. 196-207.*

Kilic, O. et al., "Asymmetrical spectral response in fiber Fabry-Perot interferometers," *IEEE J. Lightwave Technol.* vol. 27, No. 24, 5648-5656 (Dec. 2009).

Kilic, O. et al., "External fibre Fabry-Perot acoustic sensor based on a photonic-crystal mirror," *Meas. Sci. Technol.* 18, 3049 (2007).

Kilic, O., "Fiber based photonic-crystal acoustic sensor," Ph.D. Thesis, Stanford University (2008).

Korvink, J. and Paul, O. (eds.), "MEMS—A Practical Guide to Design, Analysis and Applications," William Andrew Publishing, Norwich, 2006, pp. 345-402.

Lamoreaux, S.K. and Buttler, W.T., "Thermal noise limitations to force measurements with torsion pendulums: Applications to the measurement of the Casimir force and its thermal correction," *Phys. Rev. E* 71, 036109 (2005).

M'Closkey, R.T. et al., "System identification of a MEMS gyroscope," *J. Dynamic Syst. Meas. Contr.* 123, 201-210 (2001).

Ra, H. et al., "Two-dimensional MEMS scanner for dual-axes confocal microscopy," *J. Microelectromech. Syst.* 16, 969 (2007).

Tang, T.K. et al., "Silicon bulk micromachined vibratory gyroscope for microspacecraft,"Proc. SPIE vol. 2810, p. 101 (1996).

Xie, H. and Fedder, G.K., "Integrated microelectromechanical gyroscopes," *J. Aerospace Eng.* vol. 16, p. 65 (2003).

Kilic, O. et al., "Optomechanical fiber gyroscope," *Proc. of SPIE*, vol. 7503, $20^{th}$ International Conference on Optical Fibre Sensors, 750345-1-750345-4 (Oct. 5, 2009).

Extended European Search Report re EPO Application No. 10250864.5, mailed Jan. 20, 2012.

* cited by examiner

Differential sensing:

Resonant driving:
- Modulate laser power at mechanical resonance frequency

GYROSCOPE UTILIZING MEMS AND OPTICAL SENSING

CLAIM OF PRIORITY

The present application claims the benefit of priority to U.S. Provisional Patent Application No. 61/174,969, filed on May 1, 2009, and incorporated in its entirety by reference herein.

BACKGROUND OF THE INVENTION

1. Field of the Invention

This application relates generally to gyroscopes, and more specifically, to gyroscopes utilizing optical sensing.

2. Description of the Related Art

Known optical fiber gyroscopes (e.g., fiber-optic gyroscopes or fiber ring gyroscopes) do not have mechanical parts and are based on the Sagnac effect. While miniature mechanical gyroscopes are known (See, e.g., J. J. Bernstein, U.S. Pat. No. 5,203,208 and T. K. Tang et al., U.S. Pat. No. 5,894,090), conventional miniature mechanical gyroscopes are generally based on microelectromechanical system (MEMS) technology, and the rotation applied to the gyroscope is sensed using electrostatics or some form of magnetic sensing. The rotation sensitivity of conventional MEMS-based gyroscopes is limited, and several orders of magnitude worse than Sagnac-based optical gyroscopes.

For example, the performance of conventional MEMS-based gyroscopes is usually limited by the electronic noise, which is fairly high. Therefore, these existing gyroscopes must be operated at a mechanical resonance frequency of the structure (e.g., of the two or more oscillating plates) in order to enhance the signal resulting from the applied rotation. In order for the two plates of such conventional devices to be operated on resonance, they must exhibit at least one set of identical resonance frequencies. Achieving identical resonance frequencies requires very accurate tuning of the structural parameters during fabrication, which is often limited by fabrication tolerances. To achieve good sensitivity with such configurations, the mechanical quality factor is designed to be very large, making it very hard to design a structure in which the mechanical drive and sense frequencies match. A high quality factor also reduces the measurement bandwidth, i.e., the dynamic range of the sensor, since the bandwidth scales with the inverse of the quality factor.

As a result of these complexities, and of the fairly high electronic noise, current MEMS gyroscopes exhibit a relatively low sensitivity. A typical good MEMS gyroscope usually can detect in the range of 0.1 to 1 deg/s. See, e.g., C. Acar and A. Shkel, *MEMS vibratory gyroscopes: structural approaches to improve robustness*, Springer (2008). A minimum detectable rotation rate of 0.05 deg/s has also been reported. See H. Xie and G. K. Fedder, "Integrated microelectromechanical gyroscopes," *J. Aerospace Eng*. Vol. 16, p. 65 (2003). There are a few reports of MEMS gyroscopes with much better sensitivities (~10 deg/h) (see, e.g., Acar and Shkel), but they operate in vacuum and have very tightly matched drive and sense modes. See, e.g., T. K. Tang, R. C. Gutierrez, J. Z. Wilcox, C. Stell, V. Vorperian, M. Dickerson, B. Goldstein, J. L. Savino, W. J. Li, R. J. Calvet, I. Charkaborty, R. K., Bartman, and W. J. Kaiser, "Silicon bulk micromachined vibratory gyroscope for microspacecraft, "Proc. SPIE Vol. 2810, p. 101 (1996). Such configurations may be difficult to reproduce on a large scale and at a low cost.

SUMMARY

In certain embodiments, a gyroscope is provided. The gyroscope comprises a structure configured to be driven to move about a drive axis. The structure is further configured to move about a sense axis in response to a Coriolis force generated by rotation of the structure about a rotational axis while moving about the drive axis. The gyroscope further comprises an optical sensor system configured to optically measure movement of the structure about the sense axis. In certain embodiments, the gyroscope is a microelectromechanical system (MEMS) gyroscope.

In certain embodiments, a method of detecting rotation is provided. The method comprises providing a structure configured to be driven to move about a drive axis and to move about a sense axis in response to a Coriolis force generated by rotation of the structure about a rotational axis while moving about the drive axis. The method further comprises driving the structure to move about the drive axis. The method further comprises rotating the structure about the rotational axis while the structure moves about the drive axis. The method further comprises optically measuring movement of the structure about the sense axis.

In certain embodiments, optically measuring movement of the structure comprises irradiating at least a portion of the structure with electromagnetic radiation and receiving reflected electromagnetic radiation from the portion of the structure. In certain embodiments, optically measuring movement of the structure further comprises detecting at least a portion of the received reflected electromagnetic radiation and generating one or more signals in response to the detected portion of the received reflected electromagnetic radiation.

In certain embodiments, the method further comprises centering the post portion on the structure. In certain such embodiments, centering the post portion comprises placing a sensor on the sense axis; measuring a first noise spectrum having a first peak at a resonance frequency of a sense mode; placing the sensor on the drive axis; measuring a second noise spectrum having second peak at a resonance frequency of a drive mode; and determining a position of the post portion on the structure where the first and second peaks are reduced.

For the gyroscope and/or the method of detecting rotation, the structure of certain embodiments comprises a generally planar portion, at least one first torsional spring extending generally along the drive axis and operationally coupling the generally planar portion to a support structure, and at least one second torsional spring extending generally along the sense axis and operationally coupling the generally planar portion to the support structure. The generally planar portion of certain embodiments comprises at least two drive arms extending in opposite directions from one another generally along the sense axis, wherein the at least second drive torsional spring operationally couples the at least two drive arms to the support structure. The generally planar portion of certain embodiments comprises at least two sense arms extending in opposite directions from one another generally along the drive axis, wherein the at least one first torsional spring operationally couples the at least two sense arms to the support structure.

The structure of certain embodiments comprises a post portion extending generally perpendicularly away from the generally planar portion. The rotational axis of certain embodiments is substantially perpendicular to at least one of the drive axis and the sense axis.

The optical sensor system of certain embodiments comprises one or more optical fibers configured to irradiate at least a portion of the structure with electromagnetic radiation and to receive reflected electromagnetic radiation from the portion of the structure. In certain embodiments, the one or more optical fibers and the portion of the structure form at least one Fabry-Perot cavity therebetween. The optical sensor system of certain embodiments further comprises one or more optical detectors in optical communication with the one or more optical fibers, with the one or more optical detectors configured to receive electromagnetic radiation reflected from the portion of the structure and transmitted by the one or more optical fibers and to generate one or more signals in response to the received electromagnetic radiation. The portion of the structure of certain embodiments comprises one or more photonic-crystal structures.

In certain embodiments, the gyroscope further comprises a drive system configured to drive the structure to oscillate about the drive axis. The drive system of certain embodiments comprises one or more optical fibers configured to irradiate at least a portion of the structure with electromagnetic radiation having sufficient radiation pressure to drive the structure to oscillate about the drive axis. In certain embodiments, the one or more optical fibers and the portion of the structure form at least one Fabry-Perot cavity therebetween. In certain other embodiments, the drive system comprises one or more electrodes configured to apply sufficient electrostatic force on at least a portion of the structure to drive the structure to oscillate about the drive axis.

DETAILED DESCRIPTION

Figure 1A:
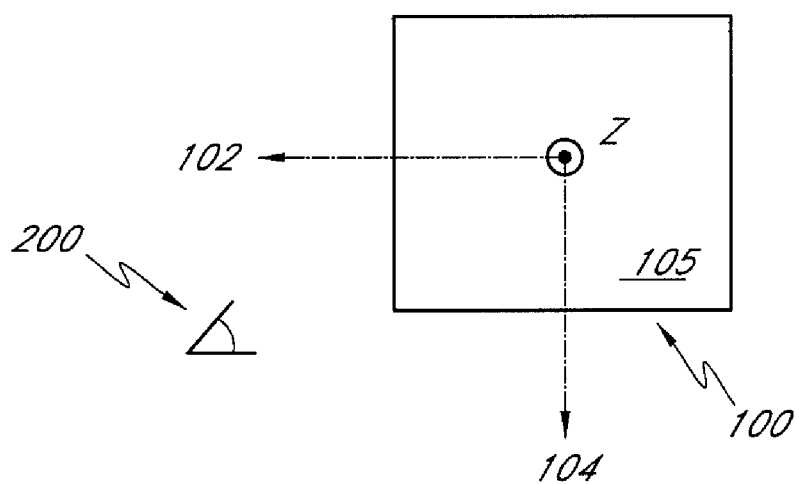
FIGS. 1a and 1b schematically illustrate example gyroscopes in accordance with certain embodiments described herein.

Certain embodiments described herein include a mechanical structure and are based on the Coriolis effect. The device in accordance with certain embodiments described herein is based on a miniature Foucault pendulum. The set of limitations on the performance of certain embodiments described herein is different from the limitations of Sagnac-based optical gyroscopes. Therefore, a gyroscope in accordance with certain embodiments described herein is not limited by the problems limiting known Sagnac-based fiber-optic gyroscopes. In certain embodiments, the gyroscope can be made very small in size (e.g., within a few millimeters in every dimension). Therefore, certain such embodiments provide substantial reductions in size which can be advantageous for certain applications. Also, certain embodiments described herein provide the possibility of mass production, hence significant reduction in cost.

In addition, in contrast to conventional MEMS-based gyroscopes, in certain embodiments described herein, rotation is sensed optically, thereby providing an advantage in the noise performance of the gyroscope, which translates in a far superior rotation sensitivity. In certain embodiments described herein, the gyroscope is also driven optically, thereby reducing the electromagnetic interference due to the electrical drive normally used in MEMS gyroscopes.

Employing optics in sensing instead of electrostatics or some form of magnetic sensing in certain embodiments described herein can advantageously reduce the limiting noise to the mechanical thermal noise of the structure. This noise has the same frequency dependence as does the signal. Therefore, at a resonance frequency of the structure, the noise is high like the signal, and at non-resonant frequencies, the noise is low like the signal. Therefore, for optical sensing, the signal-to-noise ratio (SNR) is not improved when the sensing is done at a mechanical resonance frequency (e.g., 100 Hz to 10 kHz, sensitivities are typically higher in MEMS gyroscopes at lower frequencies). Conversely, for optical sensing, the signal-to-noise ratio (SNR) is not degraded when the sensing is done away from a mechanical resonance frequency. In certain embodiments, sensing can be performed at a non-resonant frequency, thereby improving the bandwidth significantly without compromising the SNR. Also, by operating at non-resonant frequencies in certain embodiments, the settling time of the gyroscope can be reduced, so that faster rotation sensing can be performed. For the example gyroscope discussed below, certain embodiments described herein can lead to a minimum detectable rotation of about 5 deg/h (with a 1-Hz detection bandwidth). With straightforward improvements also suggested below, this figure can be improved in certain embodiments (e.g., 1 deg/h for the same 1-Hz bandwidth). A fiber-optic gyroscope (FOG) in accordance with certain embodiments described herein can easily detect 1/1000th of the Earth's rotation rate, or 0.015 deg/h, and even better if the long-term stability requirement is relaxed.

In recent years there has been a surge in the commercial development of gimbaled, large amplitude, two-axis scanning MEMS mirrors. These mirrors are intended to be used in projectors (called pico-projectors) in portable devices such as cellular phones. There are several companies that produce these mirrors, such as Hiperscan GmbH, Microvision Inc., and Electro-Optical Products Corp. By modifying these commercially available micro-mirrors with certain embodiments described herein, it is possible to build optomechanical fiber gyroscopes in a cheaper way.

FIG. 1a schematically illustrates an example gyroscope 10 in accordance with certain embodiments described herein. The gyroscope 10 of certain embodiments comprises a structure 100 configured to be driven to move about a first axis, e.g., drive axis 102. The structure 100 is further configured to move about a second axis, e.g., sense axis 104, in response to a Coriolis force generated by rotation of the structure 100 about a rotational axis z while moving (e.g., vibrating) about the drive axis 102. The gyroscope 10 of certain embodiments further comprises an optical sensor system 200 configured to optically measure movement (e.g., vibration) of the structure 100 about the sense axis 104.

In certain embodiments, the gyroscope 10 is a microelectromechanical system (MEMS) gyroscope. In certain embodiments, the gyroscope 10 comprises one or more components which are micromachined (e.g., from a substrate). The gyroscope 10 can comprise one or more components which are made of silicon, polysilicon, silica, or quartz, or combinations thereof. Certain embodiments can include silicon-nitride layers for stress compensation. Also, metal layers (e.g., polished or deposited surfaces comprising gold, silver, aluminum, chrome, titanium, platinum), conventional multi-layer dielectric coatings, or photonic crystals can be used in certain embodiments described herein to enhance optical reflections when an optical sensing method is employed, as described more fully below.

Figure 2:
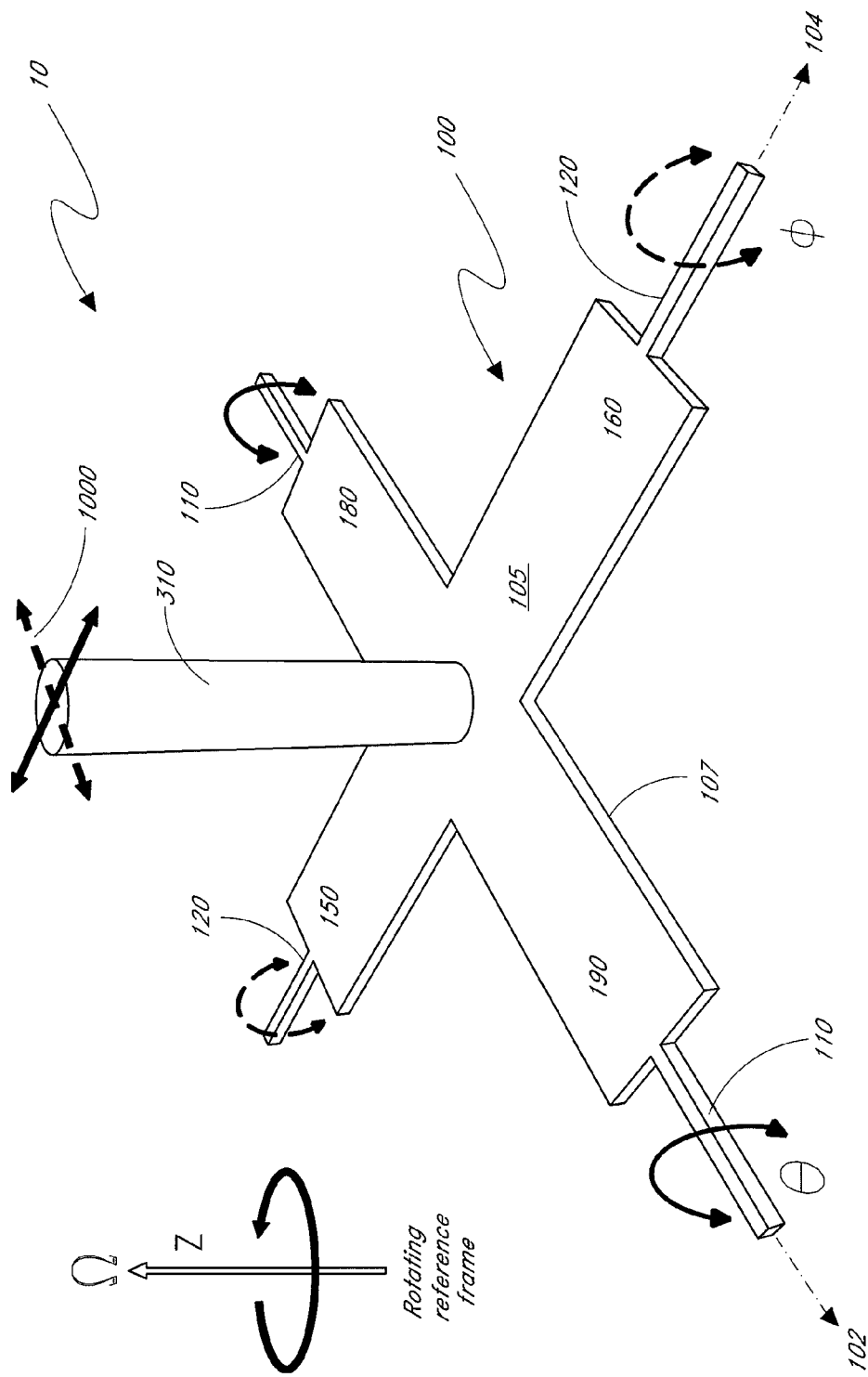
FIG. 2 shows a simplified drawing of an example gyroscope in accordance with certain embodiments described herein.

In certain embodiments, the structure 100 comprises a generally planar portion 105. For example, FIG. 2 is a simplified drawing of an example gyroscope 10 in accordance with certain embodiments described herein. In certain embodiments, the generally planar portion 105 comprises a base plate 107. The base plate 107 of certain embodiments comprises a single generally planar plate having four generally perpendicular arms, while certain other embodiments, the base plate 107 comprises two or more plates mechanically coupled to one another. In still other certain embodiments, the base plate 107 has another shape (e.g., square, circular, polygonal, irregular), with or without arms.

As shown in FIG. 2, the generally planar portion 105 of the structure 100 in certain embodiments comprises at least two drive arms 150, 160 extending in opposite directions from one another generally along the sense axis 104. For example, the drive arms 150, 160 can comprise silicon and have a length of about 1400 microns, in a range between about 500 microns and 2500 microns, or in a range between about 1000 microns and about 2000 microns.

In certain embodiments, the generally planar portion 105 of the structure 100 comprises at least two sense arms 180, 190 extending in opposite directions from one another generally along the drive axis 102. For example, the sense arms 180, 190 can comprise silicon and have a length of about 1400 microns, in a range between about 500 microns and 2500 microns, or in a range between about 1000 microns and about 2000 microns.

Figure 1B:
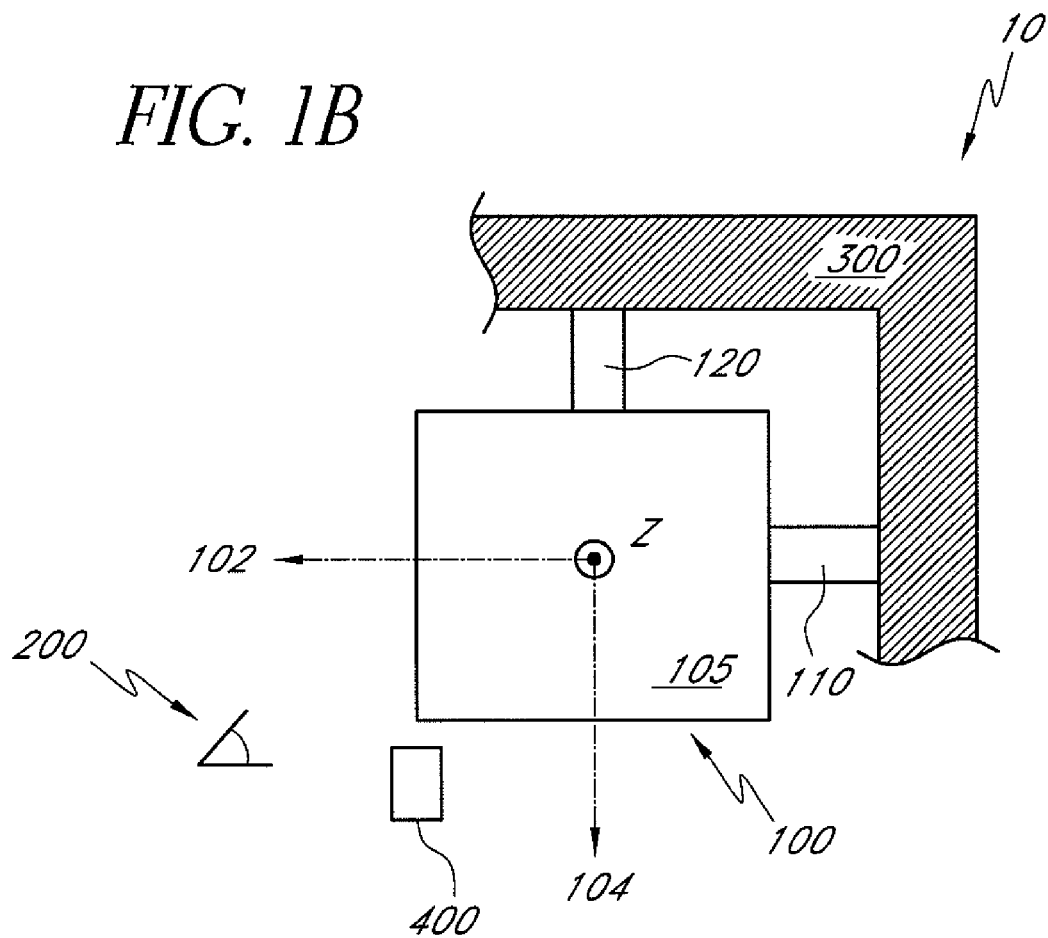

The structure 100 further comprises at least one first torsional spring 110, as schematically illustrated in FIG. 1b, extending generally along the drive axis 102 and operationally coupling the generally planar portion 105 to a support structure 300. The structure 100 also comprises at least one second torsional spring 120 extending generally along the sense axis 104 and operationally coupling the generally planar portion 105 to the support structure 300. For example in FIG. 2, the structure 100 comprises two second torsional springs 120 operationally coupled to the two drive arms 150, 160 and to the support structure 300 (not shown), and further comprise two first torsional springs 110 operationally coupled to the two sense arms 180, 190 and to the support structure 300 (not shown).

In certain embodiments, the torsional springs 110, 120 may be one of a variety of torsional springs well known in the art, although other types of springs well known in the art or yet to be devised may be used as well. In certain embodiments, the torsional springs comprise the same material as does the generally planar portion 105 of the structure 100. For example, the at least one first torsional spring 110 can comprise silicon, have a length in a range between about 100 microns and about 500 microns (e.g., about 350 microns), a width in a range between 2 microns and 15 microns (e.g., about 8 microns), and a thickness in a range between 10 microns and 50 microns (e.g., about 30 microns), and the at least one second torsional spring 120 can comprise silicon, have a length in a range between about 100 microns and about 500 microns (e.g., about 350 microns), a width in a range between 2 microns and 15 microns (e.g., about 8 microns), and a thickness in a range between 20 microns and 100 microns (e.g., about 60 microns). In certain embodiments, the springs are generally rectangular-shaped, but other shapes (e.g., serpentine-shaped) are also compatible with various embodiments described herein, depending on the space constraints and stiffness requirements.

In certain embodiments, the drive axis 102 is substantially planar with and substantially perpendicular to the sense axis 104. While having an angle of about 90° between the drive axis 102 and the sense axis 104 is advantageous, in certain other embodiments, the drive axis 102 and the sense axis 104 are substantially planar with one another but have an angle different from 90° between the drive axis 102 and the sense axis 104. In certain embodiments, the drive axis 102 and the sense axis 104 are not co-planar with one another. The structure 100 of certain embodiments can vibrate or oscillate around each of the two axes 102 and 104.

As schematically illustrated in FIG. 1b, certain embodiments further comprise a drive system 400 configured to drive the structure 100 to vibrate or oscillate at a certain frequency $\omega$ around or about the drive axis 102 with an angular deflection $\theta$. This motion can be driven either optically (e.g., employing radiation pressure) or electrostatically (e.g., using MEMS electrodes).

Figure 3:
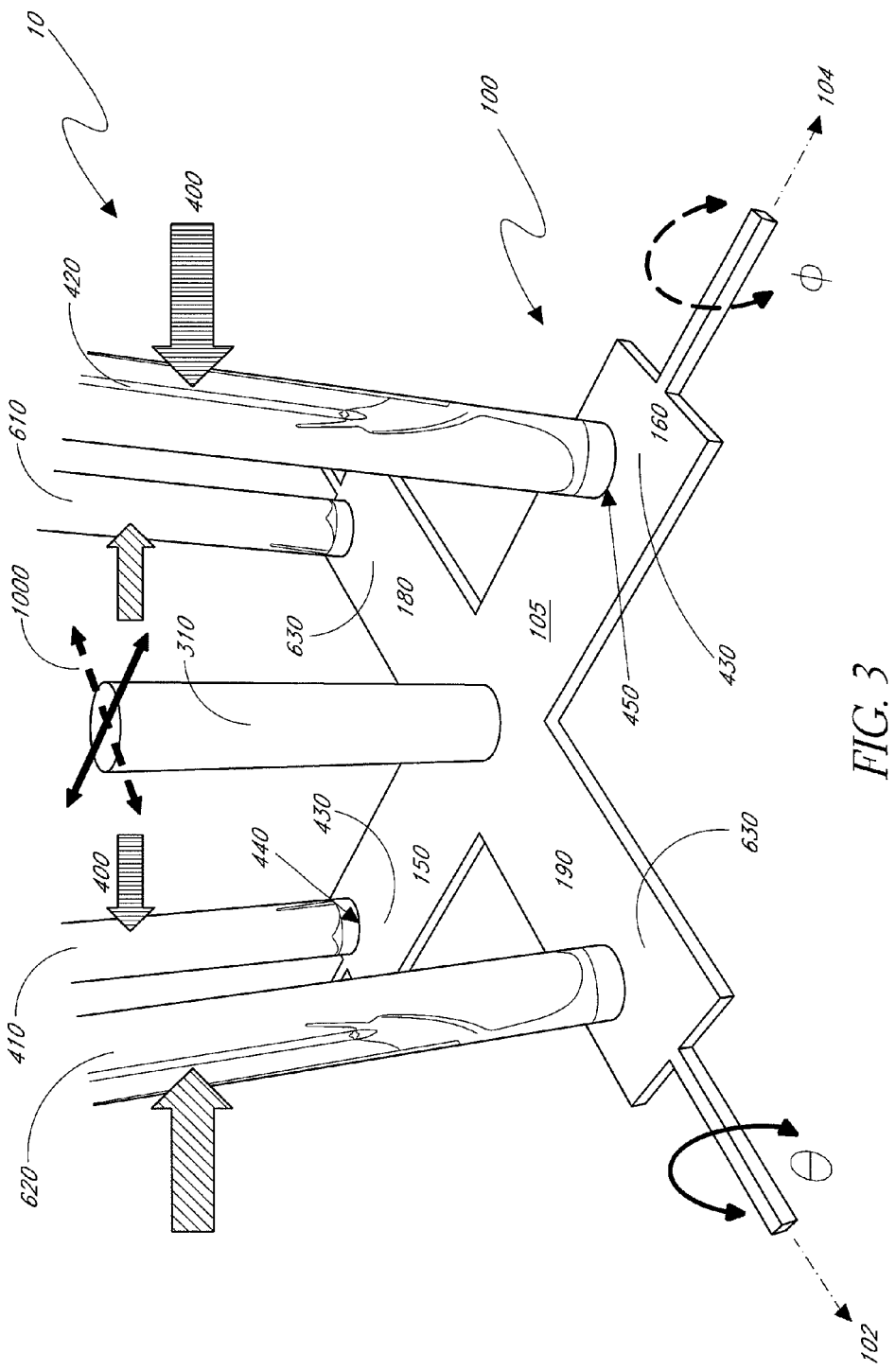
FIG. 3 shows a drawing of an example gyroscope in accordance with certain embodiments described herein.

In certain embodiments that are driven optically, the drive system 400 can comprise one or more optical fibers optically coupled to corresponding portions of the structure 100. For example, FIG. 3 is a simplified drawing of certain embodiments comprising a drive system 400 configured to drive the structure 100 optically. The drive system 400 of FIG. 3 comprises a pair of optical fibers 410, 420 (and denoted by arrows with vertical hatchings), each of which is optically coupled to a corresponding portion of the structure 100 to form two Fabry-Perot interferometers 440, 450. In certain such embodiments, at least one Fabry-Perot interferometer 440, 450 is formed between a portion 430 of the structure 100 (e.g., corresponding portions of the drive arms 150, 160) and one or more optical fibers 410, 420. The one or more optical fibers 410, 420 are configured to irradiate at least the portion 430 of the structure 100 (e.g., corresponding portions near the tips of the drive arms 150, 160) with electromagnetic radiation having sufficient radiation pressure to drive the structure 100 to move (e.g., oscillate) about the drive axis 102 (e.g., with an amplitude large enough to achieve a desired level of sensitivity of at least 0.0015 degree/hour, or across a range between 0.0015 degree/hour and 15 degrees/hour, or across a range between 0.0015 degree/hour and $1.296 \times 10^7$ degrees/hour). The radiation pressure caused by the photon flux inside each of these two Fabry-Perot interferometers 440, 450 drives the vibrations or oscillations of the structure 100 around the drive axis 102. In certain other embodiments, the one or more optical fibers do not form Fabry-Perot cavities with the structure 100, but do provide sufficient radiation pressure to bring the movement of the structure 100 about the drive axis 102.

In certain embodiments which utilize a pair of optical fibers 410, 420 on opposite arms 150, 160 of the structure 100 to drive the vibrations or oscillations around the drive axis 102 (e.g., FIG. 3), the wavelength of the laser light used to drive the radiation pressure Fabry-Perot interferometers 440, 450 is set to one of the optical resonance wavelengths of the fiber Fabry-Perot interferometers 440, 450. In certain such embodiments, the light used in the two Fabry-Perot interferometers 440, 450 to drive the structure 100 can be modulated in opposite phases with one another. This configuration can increase the torque about the drive axis 102, which can yield larger drive amplitudes.

In certain embodiments, the radiation pressure is produced by launching light of sufficient intensity through an optical fiber directly near a tip of the drive-axis arms without using a Fabry-Perot cavity to enhance the optical flux. This approach typically utilizes more power than the Fabry-Perot approach. However, because it does not use a Fabry-Perot cavity, the stability of the device is improved, a benefit that may outweigh the increased power requirement. Which of the two approaches is to be selected depends to a large degree on the trade-off between a higher power requirement (which likely translates into a higher cost) and higher stability (which translates into a poorer long-term stability and/or more complex engineering to improve the stability). This trade-off can be easily analyzed theoretically using basic concepts in optics. In addition, in certain embodiments in which multiple portions of the structure 100 on generally opposite sections of the structure 100 (e.g., either on generally opposite top and bottom surfaces or on portions located on generally opposite sides in relation to the center-of-gravity or pivot point of the structure 100) are irradiated by light emitted by multiple optical fibers, the light emitted by these optical fibers used to drive the structure 100 can be also modulated (e.g., in opposite phases with one another), which can have similar benefits as pointed out above.

In certain embodiments, the drive system 400 comprises at least one conventional fiber (e.g., a single-mode fiber such as the SMF-28® optical fiber available from Corning, Inc. of Corning, N.Y.). In certain embodiments, the one or more fibers of the drive system 400 can be either a single-mode fiber or a multimode fiber (e.g., INFINICOR® fiber available from Corning, Inc. of Corning, N.Y.). In certain embodiments, the one or more fibers of the drive system 400 can advantageously be a polarization-maintaining fiber, or a polarizing fiber, to excite a single and stable state of polarization in the Fabry-Perot interferometers during operation. In certain such embodiments, fluctuations in the response of the FP sensor caused by birefringence in the FP interferometers is advantageously removed, for example, due to any dependence of the reflectivities on polarization (although such dependencies are small in certain embodiments). The spacing between the fiber and the plate (or equivalently the cavity length for a FP interferometer) (e.g., in a range between about 10 microns to about 1 millimeter) is not critical for certain embodiments (e.g., in which a FP interferometer is not used for the irradiation). In certain embodiments, the irradiated area is the portion or surface of the structure 100 underneath each fiber tip on the drive arms 150, 160. In certain such embodiments in which the light impinges generally perpendicularly to a generally flat surface of the drive arms 150, 160, the forces produced by this irradiation are generally perpendicular to the surface of the drive arms 150, 160.

Figure 4:
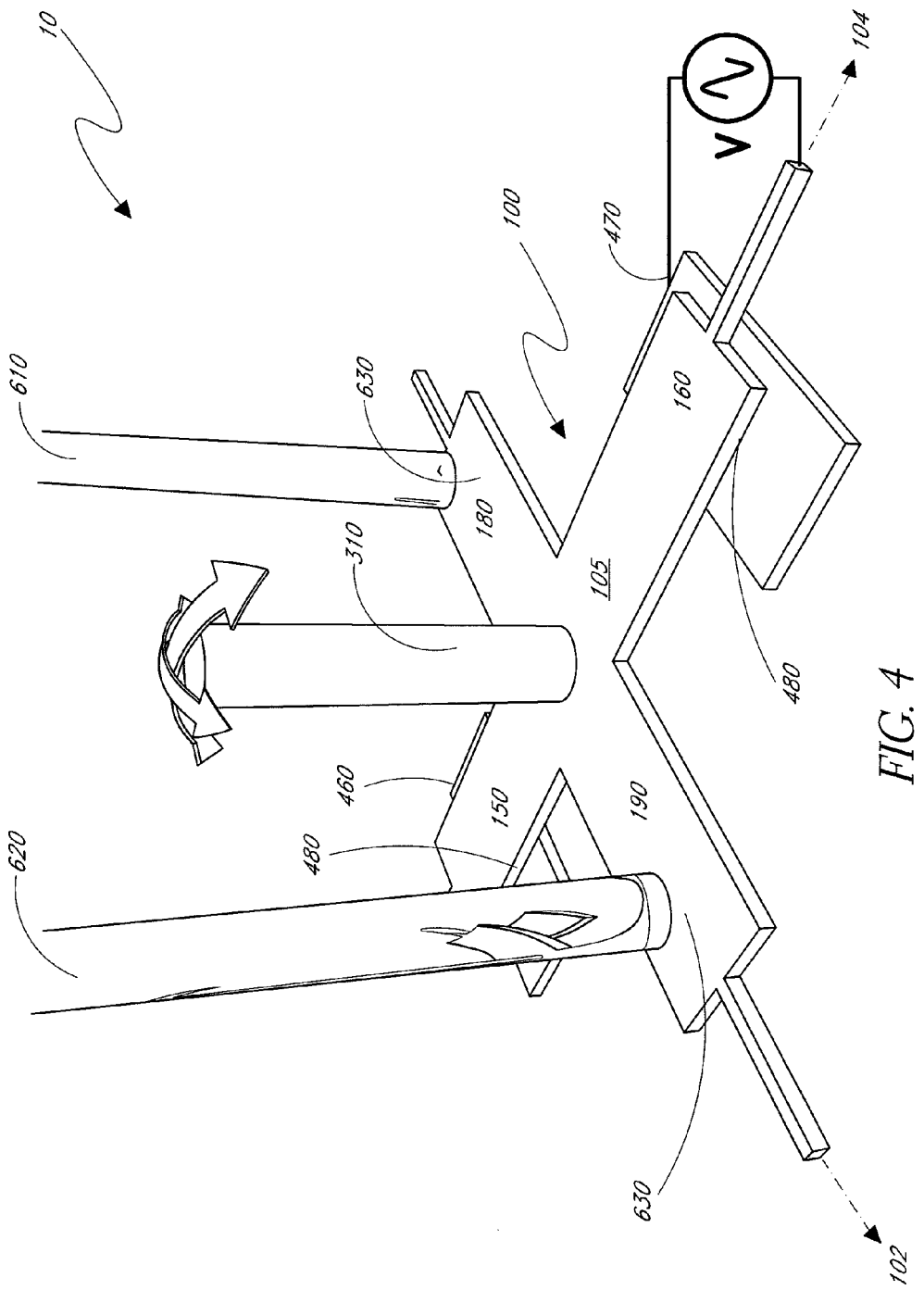
FIG. 4 shows a drawing of an example gyroscope in accordance with certain embodiments described herein.

In certain embodiments, the drive system 400 is configured to drive the structure 100 electrostatically, using MEMS electrodes, without utilizing the fiber Fabry-Perot interferometers described above. For example, as shown in FIG. 4, the drive system 400 can comprise one or more electrodes 460, 470 configured to apply sufficient electrostatic force on at least a portion 480 of the structure 100 to drive the structure 100 to oscillate about the drive axis 102 (e.g., with an amplitude large enough to achieve a desired level of sensitivity of at least 0.0015 degree/hour, or across a range between 0.0015 degree/hour and 15 degrees/hour, or across a range between 0.0015 degree/hour and $1.296 \times 10^7$ degrees/hour). In certain embodiments, the one or more electrodes 460, 470 may be one of a variety of MEMS electrodes well known in the art, although other types of electrodes well known in the art or yet to be devised may be used as well. For example, in certain embodiments, the electrodes 460, 470 can comprise parallel-plate electrodes or comb-drive electrodes. The electrodes 460, 470 can be either at generally opposite top and bottom surfaces of the structure 100 or at portions of the structure 100 located on generally opposite sides in relation to the center-of-gravity or pivot point of the structure 100. The electrostatic force is attractive, such that the structure 100 is attracted towards the electrodes 460, 470 when voltage is applied. In certain other embodiments, one or more electromagnets can be used to provide the driving force on the structure 100. For example, in certain embodiments, a combination of a permanent magnet and an electromagnet, or a combination of two electromagnets, can be used. In certain such embodiments, at least one magnet is positioned on the structure 100 and at least one magnet is spaced from the structure 100, similar to the electrode configuration, to produce magnetic forces to drive the structure 100. Example configurations compatible with certain embodiments described herein to generate the driving force are described by J. Korvink and O. Paul (eds.), "MEMS—A Practical Guide to Design, Analysis and Applications," William Andrew Publishing, Norwich, 2006, pp. 345-402, and references therein.

In certain embodiments, the structure 100 comprises a post portion 310. The post portion 310 of certain embodiments is mechanically coupled to and extending generally perpendicular away from the generally planar portion 105 of the structure 100. For example, in certain embodiments, as schematically illustrated by FIGS. 2, 3, and 4, the post portion 310 extends generally along the rotational axis z which is substantially perpendicular to the drive axis 102 and the sense axis 104. While having an angle of about 90° between the rotational axis z and one or both of the drive axis 102 and the sense axis 104 is advantageous, in certain other embodiments, the rotational axis z has an angle different from 90° between it and one or both of the drive axis 102 and the sense axis 104. In certain such embodiments, such a tilt angle may induce asymmetry in the oscillation which may not be advantageous, or may induce wobbling which may also not be advantageous.

In certain embodiments, the post portion 310 is located at the center (e.g., the center of mass) of the generally planar portion 105. In certain embodiments in which the post portion 310 comprises multiple portions, these multiple portions can be spaced away from the center of the generally planar portion 105 but are positioned generally symmetrically about the center (e.g., such that wobbling of the structure 100 is avoided, minimized, or reduced, or such that sensitivity is not degraded). When the gyroscope 10 experiences a rotation around the z-axis (e.g., the axis along the post portion 310), the Coriolis effect will induce a force 1000 in a direction (shown by the dashed, double-headed arrow in FIGS. 2 and 3) perpendicular to the direction (shown by the solid, double-headed arrow in FIGS. 2 and 3) of the motion of the post portion about the drive axis 102. Therefore, the post portion 310 will vibrate or oscillate about or around the sense axis 104 with an angular deflection φ at the drive frequency ω.

In certain embodiments, the post portion 310 can be made of the same materials as that of the structure 100. For example, the post portion 310 can be made of a generally rigid material, including but not limited to, silicon, polysilicon, silica, quartz, iron, brass, glass, hard plastic, or Teflon. For example, in certain embodiments, the post portion 310 comprises a length (e.g., 10-20 millimeters) of conventional optical fiber, stripped of its jacket. In certain embodiments, the post portion 310 is shaped (e.g., lollipop-shaped) such that its mass is concentrated towards the top of the post portion 310 rather than the bottom of the post portion 310 where it is mechanically coupled to the plate portion 110 of the structure. Certain such embodiments can provide a better performance than post portions 310 with a uniformly distributed mass.

In certain embodiments, the vibrations or oscillations about the sense axis 104 are measured optically using an optical sensor system 200 configured to provide information about the rotation rate of the gyroscope 10 about the z-axis. FIG. 3 shows an example gyroscope 10 driven optically and measured optically, while FIG. 4 shows an example gyroscope 10 driven electrostatically and measured optically. In certain embodiments, the optical sensor system 200 comprises one or more fiber Fabry-Perot interferometers (see, e.g., U.S. Pat. No. 7,526,148, U.S. Pat. No. 7,630,589, and U.S. Pat. Appl. Publ. No. 2008/0034866A1, each of which is incorporated in its entirety by reference herein).

For example, in certain embodiments, the optical sensor system 200 comprises one or more optical fibers. In each of FIGS. 3 and 4, the example gyroscope 10 comprises a pair of optical fibers 610, 620 (denoted by arrows with diagonal hatchings in FIG. 3) with each optical fiber 610, 620 forming a Fabry-Perot interferometer with a corresponding portion 630 of the structure 100 (e.g., portions of the two sensing arms 180, 190 of the generally planar portion 105 of the structure 100) to measure the sense-axis 104 oscillations in accordance with certain embodiments described herein. Each of the optical fibers 610, 620 is configured to irradiate at least a portion 630 of the structure 100 with electromagnetic radiation and to receive reflected electromagnetic radiation from the portion 630 of the structure 100. In certain such embodiments, a Fabry-Perot cavity is formed between the portion 630 of the structure 100 and the one or more optical fibers 610, 620. For example, the cavity length can be in a range between about 10 microns and about 1 millimeter.

In certain embodiments, the sensor system 200 comprises at least one conventional fiber (e.g., a single-mode fiber such as the SMF-28® optical fiber available from Corning, Inc. of Corning, N.Y.). In certain embodiments, the one or more fibers of the sensor system 200 can be either a single-mode fiber or a multimode fiber (e.g., INFINICOR® fiber available from Corning, Inc. of Corning, N.Y.). While multimode fibers provide less sensitivity, certain such embodiments can be useful in which sensitivity can be sacrificed over ease of assembly and less stringent fiber-spacing parameters. In certain embodiments, the one or more fibers of the sensor system 200 can advantageously be a polarization-maintaining fiber, or a polarizing fiber, to excite a single and stable state of polarization in the Fabry-Perot interferometers during operation. In certain such embodiments, fluctuations in the response of the FP sensor caused by birefringence in the FP interferometers is advantageously removed, for example, due to any dependence of the reflectivities on polarization (although such dependencies are small in certain embodiments). Spacing between the fiber and the plate is not critical for certain embodiments in which a FP interferometer is not used for the irradiation. In certain embodiments, the irradiated area is the portion or surface of the structure 100 underneath each fiber tip on the sense arms 180, 190. The spacings or cavity lengths for the FP interferometers on the sensing arms 180, 190 is somewhat more important than are the spacings or cavity lengths for the FP interferometers on the drive arms 150, 160. For the sensing FP interferometers, as the spacing is reduced, the light that propagates through the FP interferometer and is reflected back to the fiber has a shorter distance to travel before being recoupled into the fiber, so the light does not diffract as much. As a result, the recoupling loss is smaller, which translates into a higher finesse for the FP interferometers, and hence a greater sensitivity. There is of course diminishing returns when the spacing becomes extremely small. The spacing at which this diminishing return starts becoming apparent depends on the loss of the FP interferometer: the lossier it is, the less important diffraction loss is in relative terms, and the larger the spacing can be without compromising the finesse and sensitivity. This trade-off is discussed in a paper by Onur Kilic, Michel J. F. Digonnet, Gordon S. Kino, and Olav Solgaard, "Asymmetrical spectral response in fiber Fabry-Perot interferometers," *IEEE J. Lightwave Technol.* Vol. 27, No. 24, 5648-5656 (December 2009), which is incorporated in its entirety by reference herein.

The sensor system 200 of certain embodiments can comprise one or more components made of silicon, polysilicon, silica, or quartz and can comprise micromachined portions. In certain embodiments, the sensor system 200 can include silicon-nitride layers for stress compensation. Also, the sensor system 200 can include metal layers (e.g., polished or deposited surfaces comprising gold, silver, aluminum, chrome, titanium, platinum), conventional multilayer dielectric coatings, or photonic crystals in certain embodiments described herein to enhance the optical reflectivity of the portions of the structure 100 which are optically monitored (e.g., the portions 630 optically coupled to the one or more optical fibers).

Figure 5A:
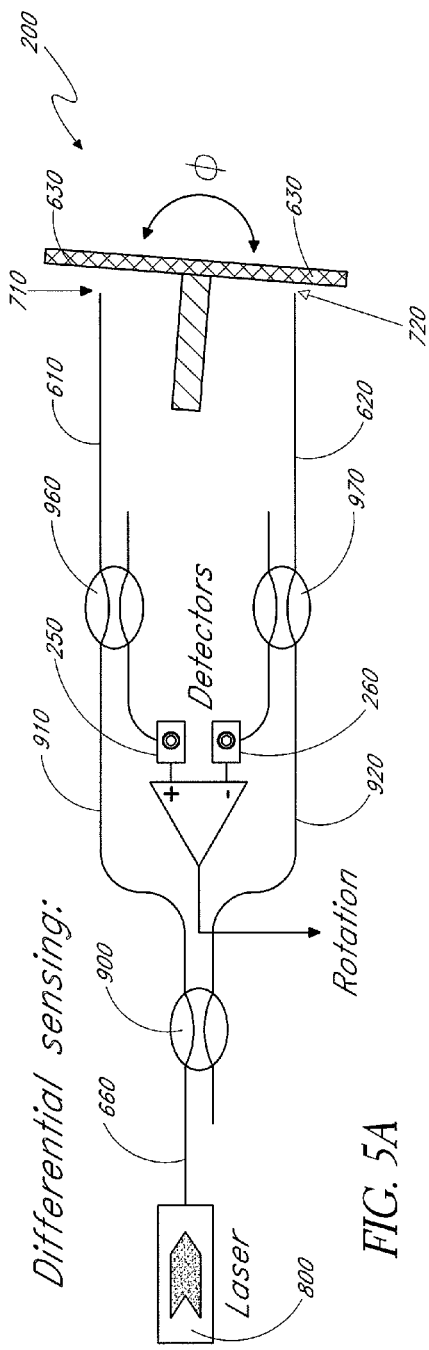
FIG. 5a schematically illustrates an example sensing mechanism using fiber Fabry-Perot interferometers in accordance with certain embodiments described herein.

FIG. 5a schematically illustrates an example optical sensor system 200 using fiber Fabry-Perot interferometers as optical sensors in accordance with certain embodiments described herein. In certain embodiments, the optical sensor system 200 comprises one or more optical detectors 250, 260 in optical communication with one or more optical fibers 610, 620 which are in optical communication with corresponding portions 630 of the structure 100. In certain embodiments, the one or more optical detectors 250, 260 may be one of a variety of photodetectors well known in the art, although detectors yet to be devised may be used as well. For example, low-noise detectors such as ones made from small-area indium-gallium-arsenide PIN photodiodes can be used. Fiber-coupled detectors are preferable over free-space detectors for practical reasons, although both are compatible with certain embodiments described herein.

The one or more optical detectors 250, 260 are configured to receive electromagnetic radiation reflected from the portion 630 of the structure 100. In certain embodiments, the electromagnetic radiation impinging on the portion 630 is transmitted by the one or more optical fibers 610, 620 and at least some of the reflected portion of this electromagnetic radiation is received by the one or more optical fibers 610, 620. The one or more optical detectors 250, 260 are configured to receive at least a portion of the reflected portion of the electromagnetic radiation received by the one or more optical fibers 610, 620 and to generate one or more signals in response to the received reflected electromagnetic radiation from the portion 630 of the structure 100.

In FIG. 5a, the one or more optical fibers 610, 620 and the corresponding portions 630 of the structure 100 form two fiber Fabry-Perot interferometers 710, 720 and a laser 800 provides electromagnetic radiation to the two Fabry-Perot interferometers 710, 720 at a wavelength that provides high displacement sensitivity in the fiber Fabry-Perot interferometers 710, 720. Specifically, the wavelength of the light in certain embodiments is selected to fall on or very near a steepest slope of the reflection spectrum of the FP interferometer for maximum sensitivity. In certain embodiments, the laser 800 may be one of a variety of lasers well known in the art (e.g., low-noise laser sources). For example, in certain embodiments, the laser 800 is a narrowband laser. Lasers yet to be devised may be used as well. Fiber-coupled lasers are preferable over free-space lasers for practical reasons, although both are compatible with certain embodiments described herein.

In certain embodiments, it is advantageous to operate at a wavelength around 1.5 μm, where the loss of the optical fibers is smaller, but other wavelengths are also compatible with certain embodiments described herein. In certain embodiments, a shorter wavelength is advantageously used (e.g., below approximately 1.1 μm) which allows use of a silicon detector, which typically has a lower noise than detectors used at longer wavelengths. The wavelength can be selected in accordance with the teachings of O. Kilic, "Fiber based photonic-crystal acoustic sensor," Ph.D. Thesis, Stanford University (2008) and O. Kilic, M. Digonnet, G. Kino, and O. Solgaard, "External fibre Fabry-Perot acoustic sensor based on a photonic-crystal mirror," *Meas. Sci. Technol.* 18, 3049 (2007), which are both incorporated in their entireties by reference herein.

In certain embodiments, the laser wavelengths and the size of the one or more Fabry-Perot cavities of the one or more fiber Fabry-Perot interferometers 710, 720 (e.g., the spacings between the ends of the one or more optical fibers 610, 620 and the portions 630 of the structure 100) are selected to provide a desired level of thermal stability. In certain embodiments, these physical parameters, as well as others, of the optical sensor system 200 are selected in accordance with the teachings of O. Kilic, "Fiber based photonic-crystal acoustic sensor," Ph.D. Thesis, Stanford University (2008) and O. Kilic, M. Digonnet, G. Kino, and O. Solgaard, "External fibre Fabry-Perot acoustic sensor based on a photonic-crystal mirror," *Meas. Sci. Technol.* 18, 3049 (2007), which are both incorporated in their entireties by reference herein. In certain embodiments, the wavelength of the light used to probe these two Fabry-Perot interferometers 710, 720 is selected to fall on the steepest portion of the resonance of the Fabry-Perot interferometers 710, 720 to maximize the Fabry-Perot interferometers' sensitivity to small displacements. See, e.g., O. Kilic, "Fiber based photonic-crystal acoustic sensor," Ph.D. Thesis, Stanford University (2008). For example, the laser can be a telecom-type laser with a typical wavelength of 1550 nanometers, the cavity spacing of the FP interferometers is between about 10 microns and 150 microns, and the displacement sensitivity is about $10^{-5}$ nanometers in a 1-Hz measurement bandwidth.

In certain embodiments, as schematically illustrated by FIG. 5a, the laser light from the laser 800 is coupled into a fiber 660 that is optically coupled to a 3-dB coupler 900 so that the optical power of the light is substantially equally separated into two arms 910, 920. In each arm 910, 920, the optical power is transmitted to a second 3-dB coupler 960, 970 and is transmitted to corresponding fiber Fabry-Perot interferometer 710, 720. The two Fabry-Perot interferometers 710, 720 in certain embodiments are on opposite sides of the sense axis 104 and oscillate or vibrate in opposite phases with one another (e.g., when the Fabry-Perot cavity spacing of one of the interferometers increases, the Fabry-Perot cavity spacing of the other interferometer decreases). The signal returning from each Fabry-Perot interferometer is transmitted to the corresponding second 3-dB coupler 960, 970 and at least a portion of the signal is sent to the corresponding optical detector 250, 260. In certain embodiments, the difference signal corresponding to a difference between the signals of the two optical detectors 250, 260 is used to obtain the rotation rate of the structure 100 about the sense axis 104. In certain embodiments, the signals from the two optical detectors 250, 260 can also be added to generate a sum signal which is used in certain embodiments to provide information regarding the acceleration of the gyroscope 10 along the z-axis. Other types of couplers 960, 970 are also compatible with certain embodiments described herein (e.g., 10%-90% couplers or optical circulators).

Figure 5B:
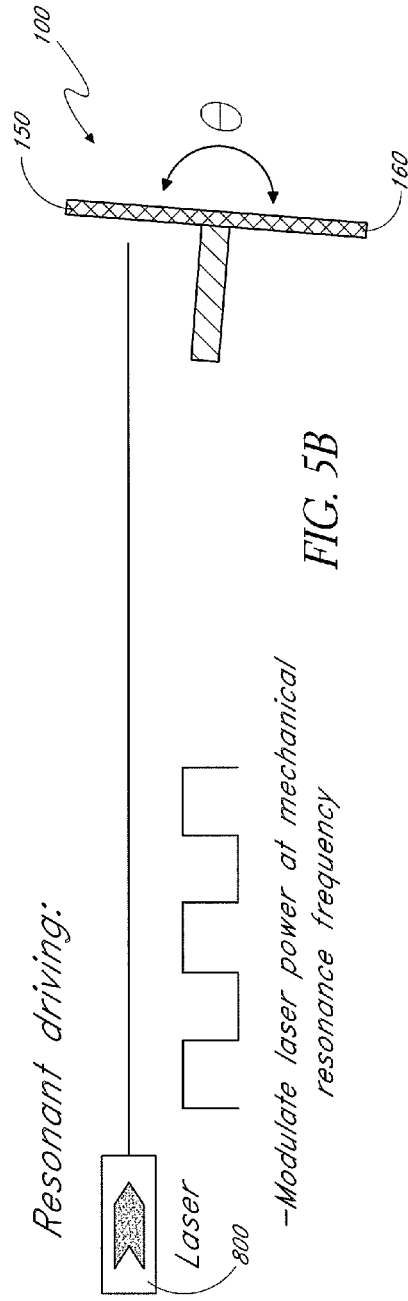
FIG. 5b schematically illustrates an example driving mechanism using radiation pressure in accordance with certain embodiments described herein.

FIG. 5b illustrates an example driving mechanism using radiation pressure in accordance with certain embodiments described herein. FIG. 5b shows that the structure 100 can be oscillated or vibrated around the drive axis 102 by modulating the laser 800 at the fundamental torsional resonance frequency of the drive axis 102. In certain embodiments, the same laser 800 is used for both driving the structure 100 and sensing the motion of the structure 100, while in certain other embodiments, separate light sources are used for driving the structure 100 and sensing the motion of the structure 100. For example, the light source used to drive the structure 100 can have a higher power output (e.g., in a range between about 1 mW to 1 W) than does the light source used to sense the motion of the structure 100. In certain embodiments in which FP interferometers are used on the drive arms 150, 160 and on the sense arms 180, 190, a narrowband source (e.g., laser) can be used to provide light to each of these FP interferometers. Even in embodiments in which FP interferometers are not used on the drive arms 150, 160 but are used on the sense arms 180, 190, a narrowband source (e.g., the same laser as used for sensing) can be used to drive the structure 100. In certain other embodiments in which FP interferometers are not used on the drive arms 150, 160, the gyroscope 10 can comprise two light sources, a source (e.g., having a narrow linewidth or without a narrow linewidth) for driving the structure 100, and a narrowband source (e.g., laser) for sensing the motion of the structure 100. Such a source without a narrow linewidth can be advantageously cheaper than a narrowband source in certain such embodiments. The drive arms 150, 160 then oscillate about the drive axis 102 at this torsional resonance frequency. By driving at the torsional resonance frequency, the structure 100 of certain embodiments responds to a given input energy (e.g., from the radiation pressure) with an oscillation of greater angular amplitude than it would at some other frequency. Thus, in certain embodiments as described more fully below, a greater minimum detectable rotation rate is advantageously achieved.

Figure 6:
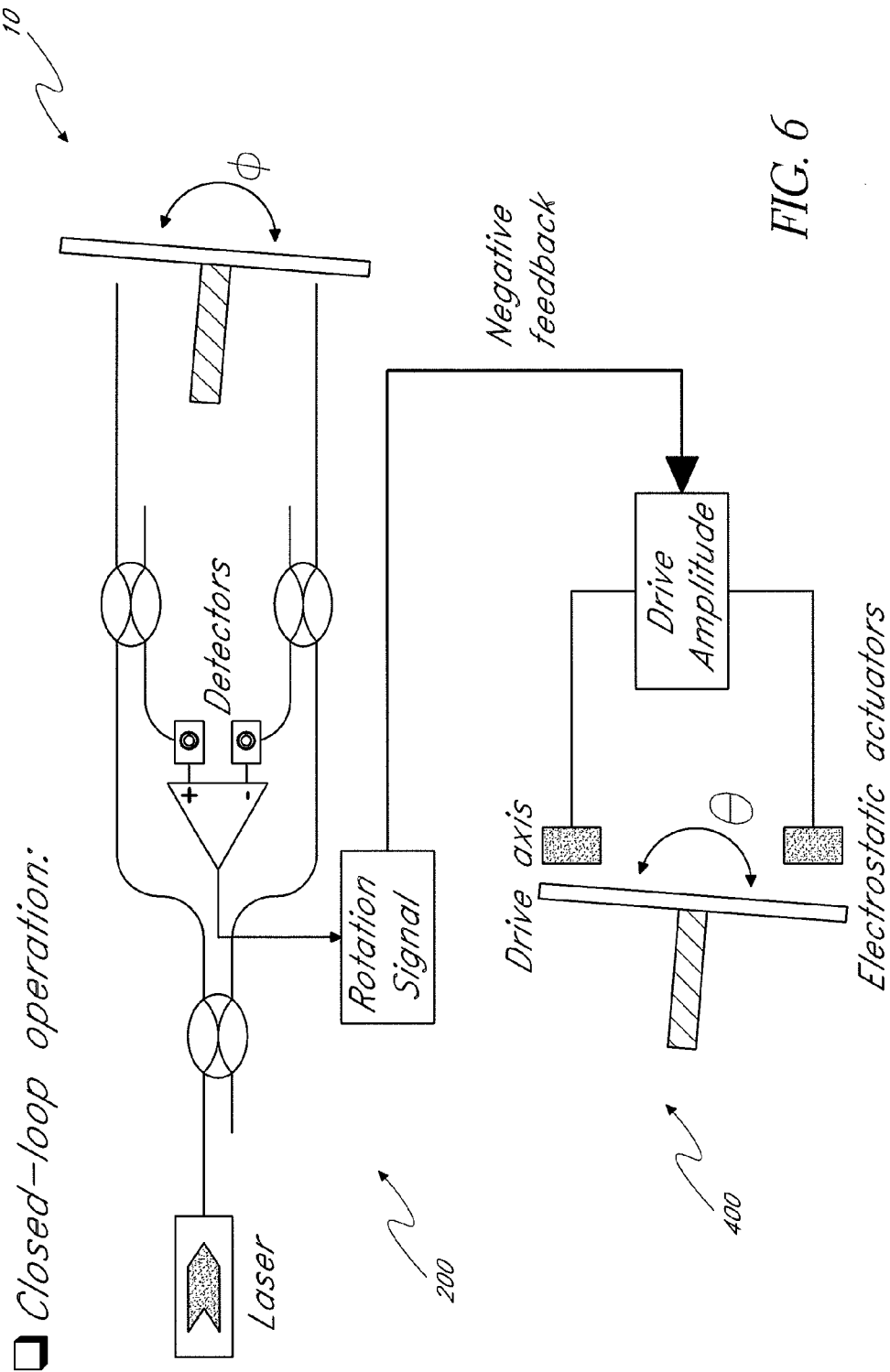
FIG. 6 schematically illustrates a closed-loop operation of a gyroscope in accordance with certain embodiments described herein.

Another advantage of certain embodiments described herein is that the gyroscope 10 is an active device. The signal strength received from the gyroscope 10 is not only determined passively by the rotation signal, but also actively by how strong the gyroscope 10 is driven by the operator. Therefore, in contrast to other types of passive sensors (e.g., fiber-optic hydrophones where the signal strength is determined passively by only the acoustic signal), in an active device, the sensitivity can be chosen so that the signal falls within the sensitive range of the device (e.g., driving the gyroscope with an amplitude sufficiently large to operate within a signal range where the signal is strong but not heavily distorted). This allows in certain embodiments, the detection of both very small signals and very large signals, and increasing the dynamic range of the active device substantially. The operation of an active device by choosing the sensitivity with respect to an initial signal is referred to as closed-loop operation, as schematically shown in FIG. 6. To operate the gyroscope 10 in this fashion, the rotation signal from the optical sensor system 200 is transmitted to a feedback circuit (negative feedback) to control the drive system 400 (either electrostatically or optically-driven). This negative feedback can be used in certain embodiments to reduce the drive amplitude when a large rotation signal is present, and similarly to increase the drive amplitude when a small rotation signal is present. A benefit of such closed-loop operation in certain embodiments is that it increases the dynamic range and linearity of the response of the sensor response.

Figure 7:
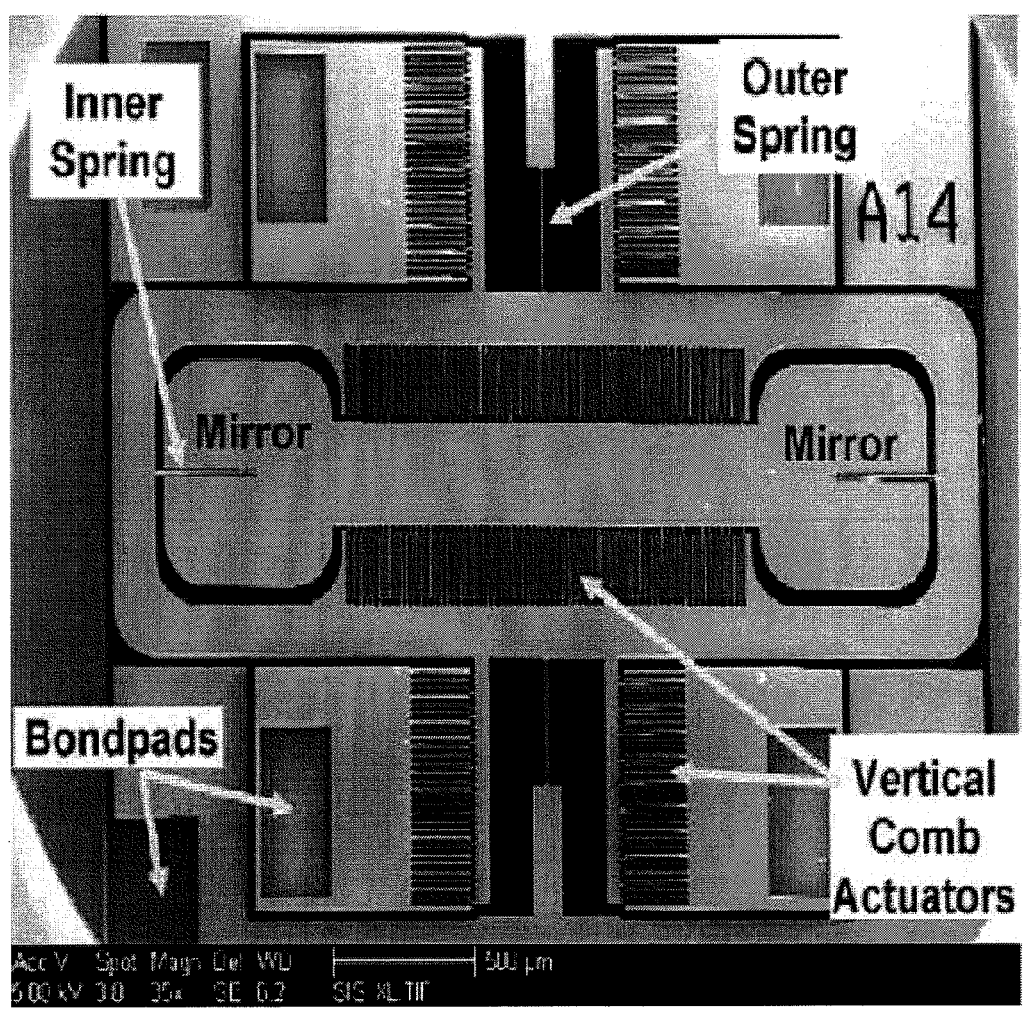
FIG. 7 shows the MEMS structure of H. Ra, W. Piyawattanametha, Y. Taguchi, D. Lee, M. J. Mandella, and O. Solgaard, "Two-dimensional MEMS scanner for dual-axes confocal microscopy," *J. Microelectromech. Syst.* 16, 969 (2007).

The following description provides an example analysis of some of the attributes of an example gyroscope 10 in accordance with certain embodiments described herein. It is a calculation of the minimum detectable rotation rate for a MEMS structure as shown by FIG. 7 (See H. Ra, W. Piyawattanametha, Y. Taguchi, D. Lee, M. J. Mandella, and O. Solgaard, "Two-dimensional MEMS scanner for dual-axes confocal microscopy," J. Microelectromech. Syst. 16, 969 (2007)), modified to include a post 310 (not shown in FIG. 7) in accordance with certain embodiments described herein.

The arm length of the above structure is 1400 μm (total horizontal length 2800 μm). The inner springs are 350 μm long, 8 μm wide, and 30 μm thick. The outer springs are 350 μm long, 8 μm wide, and 60 μm thick, twice the thickness of the inner beams.

The structure 100 has an inner axis (horizontal direction in FIG. 7) and an outer axis (vertical direction in FIG. 7). According to the electrostatic measurements in Ra et al., the mirror can deflect by 3.6° at resonance (2.9 kHz) for the inner axis, and 6.2° at resonance (500 Hz) for the outer axis. The deflection numbers cited in Ra et al. are 4 times these numbers (24.8° and 14.4°), because these cited numbers correspond to the deflection angle of an incident optical beam.

The minimum detectable rotation (MDR) can be calculated for this structure with a post attached to the center of the mirror, so that Coriolis forces can couple the two modes of motion (e.g., about each of the inner and outer axes). The calculation described below assumes that the inner axis is driven, and the outer axis oscillations are sensed.

The equations of motion for the Foucault pendulum structure have been analyzed in other references also (see, e.g., R. T. M'Closkey, S. Gibson, and J. Hui, "System identification of a MEMS gyroscope," J. Dynamic Syst. Meas. Contr. 123, 201-210 (2001)). It is a basic damped-spring-mass mechanical model that includes the inertial term, the damping term, the spring term, and the force term.

The equations of motion for the structure 100 in FIG. 2 are (see, e.g., R. T. M'Closkey et al.):

$$\text{Drive axis: } \left\{ (I_\theta + I_p) \frac{\partial^2}{\partial t^2} + \gamma_\theta \frac{\partial}{\partial t} + \kappa_\theta \right\} \theta = \tau + 2\Omega I_p \frac{\partial}{\partial t} \phi \quad (1)$$

$$\text{Sense axis: } \left\{ (I_\phi + I_p) \frac{\partial^2}{\partial t^2} + \gamma_\phi \frac{\partial}{\partial t} + \kappa_\phi \right\} \phi = -2\Omega I_p \frac{\partial}{\partial t} \theta \quad (2)$$

where $I_\theta$, $I_\phi$, and $I_p$ denote the moments of inertia of the base plate 105 around the drive axis, of the base plate 105 around the sense axis, and of the post 310, respectively. The damping for each axis is denoted with $\gamma_\theta$ and $\gamma_\phi$. The torsional spring constants are shown with $\kappa_\theta$ and $\kappa_\phi$. The torque applied to the drive axis is τ. The rotation rate applied to the entire structure 100 around the z axis is Ω. A main assumption in using these equations of motion is that the moment of inertia of the post 310 is much larger than the moment of inertia of the base plate 105, so that the Coriolis coupling is mainly due to the motion of the post 310. In certain embodiments in which this is not the case, it is straightforward to include the effect of other masses in the analysis.

Since θ ≫ φ, the Coriolis term in Eq. (1) can be neglected. For a driving torque $\tau = \tau_0 e^{j\omega t}$, with ω ≫ Ω, the angular deflection about the drive axis from Eq. (1) is $\theta = \theta_0 e^{j\omega t}$ (disregarding phase shifts), where the angular-deflection amplitude for the inner-axis deflection (drive axis) is:

$$\theta_0 = \frac{\tau_0}{\kappa_\theta} \frac{\omega_\theta^2}{\sqrt{(\omega^2 - \omega_\theta^2)^2 + \omega^2 \omega_\theta^2 / Q_\theta^2}}, \quad (3)$$

with the resonance frequency $$\omega_\theta = \sqrt{\frac{\kappa_\theta}{I_\theta + I_p}},$$

and the quality factor $$Q_\theta = \frac{\kappa_\theta}{\gamma_\theta \omega_\theta} = \frac{\omega_\theta (I_\theta + I_p)}{\gamma_\theta}.$$

Hence, at ω ≈ $\omega_\theta$, the drive amplitude is:

$$\theta_0' = \frac{\tau_0 Q_\theta}{\kappa_\theta} = \frac{\tau_0}{\gamma_\theta \omega_\theta} \quad (4)$$

Also, from Eq. (2), the angular deflection about the sense axis is $\phi = \phi_0 e^{j\omega t}$ (disregarding phase shifts), where the angular-deflection amplitude for the outer-axis deflection (sense axis) is:

$$\phi_0 = \theta_0 \frac{2 I_p \Omega \omega}{\kappa_\phi} \frac{\omega_\phi^2}{\sqrt{(\omega^2 - \omega_\phi^2)^2 + \omega^2 \omega_\phi^2 / Q_\phi^2}} \quad (5)$$

where the resonance frequency is:

$$\omega_\phi = \sqrt{\frac{\kappa_\phi}{I_\phi + I_p}} \quad (6)$$

and the Q-factor (in different parameter combinations) is:

$$Q_\phi = \frac{\kappa_\phi}{\gamma_\phi \omega_\phi} = \frac{\omega_\phi (I_\phi + I_p)}{\gamma_\phi} = \frac{\sqrt{\kappa_\phi (I_\phi + I_p)}}{\gamma_\phi} \quad (7)$$

Assuming $\omega_\phi \gg \omega_\theta$, i.e., the gyroscope 10 does not sense at resonance and does not get an enhancement by $Q_\phi$ in the sense axis, at ω ≈ $\omega_\theta$, the sense amplitude is:

$$\phi_0' = \theta_0' \frac{2 I_p \Omega \omega_\theta}{\kappa_\phi} = \frac{2 \tau_0 I_p \Omega}{\gamma_\theta \kappa_\phi} \quad (8)$$

The noise for the outer axis can be calculated by replacing the torque term of Eq. (3) with the Johnson-Nyquist equivalent torque $\tau_0 = \sqrt{4 k_B T \gamma_\phi \Delta f}$.

A. Thermal-Mechanical Noise

The spectral power of the thermal noise about or around the sense axis of the structure 10 is (see, e.g., S. K. Lamoreaux and W. T. Buttler, "Thermal noise limitations to force measurements with torsion pendulums: Applications to the measurement of the Casimir force and its thermal correction," *Phys. Rev. E* 71, 036109 (2005)):

$$|\phi_\omega|^2 = \frac{4k_B T \gamma_\phi \Delta f}{\kappa_\phi^2} \frac{\omega_\phi^4}{\sqrt{(\omega^2 - \omega_\phi^2)^2 + \omega^2 \omega_\phi^2 / Q_\phi^2}} \quad (9)$$

The noise level is then:

$$\phi_N = \sqrt{|\phi_\omega|^2} = \frac{\sqrt[2]{k_B T \gamma_\phi \Delta f}}{\kappa_\phi} \frac{\omega_\phi^2}{\sqrt{(\omega^2 - \omega_\phi^2)^2 + \omega^2 \omega_\phi^2 / Q_\phi^2}} \quad (10)$$

The noise level at the drive frequency $\omega \approx \omega_\theta$ and $\omega_\phi \gg \omega_\theta$ is:

$$\phi_N' = \phi_N(\omega \approx \omega_\theta) = \frac{\sqrt[2]{k_B T \gamma_\phi \Delta f}}{\kappa_\phi} \quad (11)$$

The assumption can be made that the sense axis measurements are limited by this thermal-noise level given in Eq. (11).

The spring constants can be calculated using the following equation given in Ra et al.:

$$\kappa_\theta = \frac{2G}{3} \frac{tw^3}{l} \left[1 - \frac{192}{\pi^5} \frac{w}{t} \tanh\left(\frac{\pi}{2} \frac{t}{w}\right)\right], \quad w < t \quad (12)$$

where G is the shear modulus of silicon, and w, t, and l are the width, thickness, and length of the torsional spring, respectively. This equation corresponds to the combined spring constant of two equivalent torsional springs on opposite sides of the structure 100. Calculating the spring constant with the parameters aforementioned (also in Ra et al.) yields:
Inner (drive) springs: $\kappa_\theta = 1.52 \times 10^{-6}$ (SI units)
Outer (sense) springs: $\kappa_\phi = 3.35 \times 10^{-6}$ (SI units)

The measurements in Ra et al. indicate a Q-factor of slightly larger than 10 for both the inner and outer axes. This Q is lower than most MEMS gyroscopes (some have Q's of >10000). However, despite this low Q, large angular displacements in the drive axis are possible due to the vertical comb-drive technology employed for the driving mechanism (see Ra et al.). Using a Q of 10, $\kappa_\phi = 3.35 \times 10^{-6}$ (SI units), and $\omega_\phi = 2\pi \times 500$ Hz, the damping yields using Eq. (7):

$$\gamma_\phi = \frac{\kappa_\phi}{Q_\phi \omega_\phi} = 5.59 \times 10^{-12} (SI \text{ units})$$

Therefore, the flat-band noise (Eq. (10)) in a 1-Hz bandwidth, at 300 K (room) temperature yields:

$$\phi_N' = \frac{\sqrt{4k_B T \gamma_\phi \Delta f}}{\kappa_\phi} = 9.08 \times 10^{-11}$$

The vertical deflection on the end of the arm is then (displacement noise the fiber Fabry-Perot encounters):

$$L_N' = L_{arm} \phi_N' = 1.27 \times 10^{-13} \text{ m} = 1.27 \times 10^{-4} \text{ nm}$$

where $L_{arm} = 1400$ μm was used. This result is an order of magnitude larger than what has been previously detected in our earlier acoustic sensor work (see O. Kilic, M. Digonnet, G. Kino, and O. Solgaard, "External fibre Fabry-Perot acoustic sensor based on a photonic-crystal mirror," *Meas. Sci. Technol.* 18, 3049 (2007)). In comparison, according to the calculations in O. Kilic, "Fiber based photonic-crystal acoustic sensor," Ph.D. Thesis, Stanford University (2008), the optoelectronic noise is in a 1-Hz bandwidth: $L_N' = 2.25 \times 10^{-8}$ nm(shot-noise limited detection, minor $R = 0.99$)

$L_N' = 2.07 \times 10^{-7}$ nm(relative intensity noise or RIN limited detection, minor $R = 0.99$)

$L_N' = 2.36 \times 10^{-7}$ nm(shot-noise limited detection, minor $R = 0.90$)

$L_N' = 2.17 \times 10^{-6}$ nm(MN limited detection, mirror $R = 0.90$)

The largest of these numbers is two orders of magnitude smaller than the thermal-noise induced displacement. This calculation shows that even when fiber Fabry-Perot interferometers with R=0.90 mirrors are used, the dominating noise in this structure will be the thermal-mechanical noise. Therefore, it can be assumed that the limiting noise in the exemplary sensor will be the thermal-mechanical noise. In certain embodiments, the structure 100 is designed such that the noise in Eq. (11) is larger than the opto-electronic noise (such as shot noise) and other noise sources. One direct way of achieving this result is by using weak torsional springs, e.g., reducing $\kappa_\phi$. The MDR can be calculated as described below.

The signal-to-noise ratio (SNR) can be obtained by dividing the signal of Eq. (5), by the noise of Eq. (10):

$$SNR = \frac{\phi_0}{\phi_N} = \frac{\theta_0 I_p \Omega \omega}{\sqrt{k_B T \gamma_\phi \Delta f}} \quad (13)$$

For an SNR of 1, the MDR is then:

$$\Omega_{min} = \frac{\sqrt{k_B T \gamma_\phi \Delta f}}{\theta_0 I_p \omega} \quad (14)$$

The damping can be replaced with more familiar parameters, so that it is easier to follow the discussion. Assuming (as described above):

$$\omega \approx \omega_\theta \quad (15)$$

the MDR (Eq. (13)) yields:

$$SNR = \theta_0' \frac{I_p \Omega \omega_\phi}{\sqrt{k_B T \gamma_\phi}} = \frac{\tau_0 I_p \Omega}{\gamma_\theta \sqrt{k_B T \gamma_\phi}} \quad (16)$$

To calculate the MDR in a 1-Hz bandwidth, an example configuration can be considered in which the post 310 is attached to the center of the MEMS structure 100 and comprises a 2.5-mm long piece of SMF-28® fiber (125 μm diameter, fused silica material), which is compatible with the MEMS dimensions and is also practical to handle.

The moment of inertia of a circular post, rotated around its end, yields:

$$I_p = \frac{1}{12}m(3a^2 + 4h^2),$$

where m is the mass, a the radius, and h is the height. For the parameters above, the value of the moment of inertia of the post 310 is:

$$I_p = 1.41 \times 10^{-13} (SI \text{ units})$$

Adding the post 310 will modify several parameters. The drive frequency is the resonance frequency of the inner axis. It was originally $\omega_\theta = 2\pi \times 2.9$ kHz (see earlier or Ra et al.). The added mass of the post 310 will reduce this resonance frequency to:

$$\omega'_\theta = \sqrt{\frac{\kappa_\theta}{I_\theta + I_p}} = \sqrt{\frac{\kappa_\theta}{\frac{\kappa_\theta}{\omega_\theta^2} + I_p}} = 2\pi \times 515 \text{ Hz}$$

Similarly, the outer axis frequency $\omega_\phi = 2\pi \times 500$ Hz will be reduced from 500 Hz to $2\pi \times 420$ Hz.

Adding mass to a spring mass system normally increases the Q-factor (see Eq. (7)), since the damping is not affected much by the additional area of the mass. However, a worst case scenario assumption can be made that the Q-factor does not increase for the case of an added post 310. Therefore, it can be assumed that the inner (drive) axis at 3.6° can be driven at resonance. Even if the Q-factor would increase, the comb-drive actuators can be provided with a smaller electrical power, so that the oscillation amplitude does not increase beyond this number. Now the MDR can be calculated. From Eq. (14):

$$\Omega_{min} = \frac{1}{\theta_0 I_p \omega} \sqrt{\frac{k_B T \kappa_\phi \Delta f}{Q_\phi \omega_\phi}}$$

For the operating frequency $\omega = \omega'_\theta = 2\pi \times 515$ Hz, and the parameters $\omega'_\phi = 2\pi \times 420$ Hz, $\theta_0 = 3.6° \times \pi/180°$, $Q_\phi = 10$, $I_p = 1.41 \times 10^{-13}$ (SI units), $\kappa_\phi = 3.35 \times 10^{-6}$ (SI units), and of $\Delta f = 1$ Hz, the MDR is:

$$\Omega_0 = 25.3 \times 10^{-6} \text{ rad/s} = 25.3 \text{ } \mu\text{rad/s} \approx 5°/h$$

The values used in this example were not selected to yield the best possible MDR. With straightforward, practical improvements in these design features, in particular a two-fold increase in the drive amplitude and in the post mass, a theoretical MDR of ~1°/h is entirely possible.

In certain embodiments as described above, oscillations or vibrations of the structure 100 around the drive axis can be driven by utilizing radiation pressure. While it is more difficult to obtain large drive amplitudes with optical actuation, as compared to electrostatic actuation, it can be useful for certain applications (such as electromagnetically harsh environments). For a Fabry-Perot cavity with finesse F, addressed with an incident optical power of $P_{in}$, the force due to radiation pressure is:

$$F_{RP} = \frac{2P_{in}}{c} \frac{F}{\pi} \quad (17)$$

This expression is only valid for small displacements, such that the resonance wavelength of the cavity is not changed much compared to its linewidth. Therefore, in certain embodiments, the dynamic range for a high finesse cavity will be limited.

The applied torque is:

$$\tau_0 = F_{RP} L_{arm} = \frac{2F}{\pi c} P_{in} L_{arm}, \quad (18)$$

where $L_{arm}$ is the length of the base arm. The equation to be optimized, with all relevant parameters, is then:

$$\Omega_{min} = C \frac{\sqrt{\gamma_\theta^2 \gamma_\phi \Delta f}}{F P_{in} L_{arm} I_p}, \quad (19)$$

where C is a constant equal to $$C = \frac{1}{2} \pi c \sqrt{k_B T}.$$

Hence, for a smaller minimum detectable rotation, F $P_{in}$ $L_{arm} I_p$ in certain embodiments is increased, and the damping $\gamma$ decreased.

Example Method to Accurately Find the Center of the Mirror

In certain embodiments, when the post structure 310 is not well centered on the base plate 105, the drive oscillation is not purely a torsional mode, but has a component that also moves the structure 100 up and down. This motion is usually referred to as a rocking mode. Although this rocking mode of the structure 100 can be filtered out by the differential sensing described herein, it may still reduce the dynamic range by creating a distortion in the rotation signal. To reduce or eliminate the rocking mode in certain embodiments, the post structure 310 can to be centered on the base plate 105 more accurately. Below, an example method to find the center of the mirror is described in accordance with certain embodiments described herein.

The fiber Fabry-Perot displacement sensors used to sense the oscillations in certain embodiments of the gyroscope are very sensitive. In certain embodiments, such sensors allow the detection of the Brownian motion of the minor, referred to as the thermal-mechanical noise. When a fiber sensor is placed to be in optical communication with a portion of the sense axis, the noise spectrum detected by the fiber sensor will have a peak at the resonance frequency of the sense mode. Similarly, when a fiber sensor is placed to be in optical communication with a portion of the drive axis, the noise spectrum detected by the fiber sensor will have a peak at the resonance frequency of the drive mode. In certain embodiments, the closer to the center of the structure 100 the fiber sensor is placed, the smaller will be these peaks in the detected noise spectra. By moving the fiber sensor towards a position where these peaks are reduced to the smallest value, it is possible to find the center of the structure 100 as accurately as possible for certain embodiments. Once this center position is determined, it can either be marked (e.g., using a very small amount of paint at the tip of the fiber sensor), or the fiber sensor itself can be fixed to that position (e.g., by a small amount of epoxy) and then cut or otherwise sized so that it can serve as a post structure 310.

Example Methods of Detecting Rotation

Figure 8:
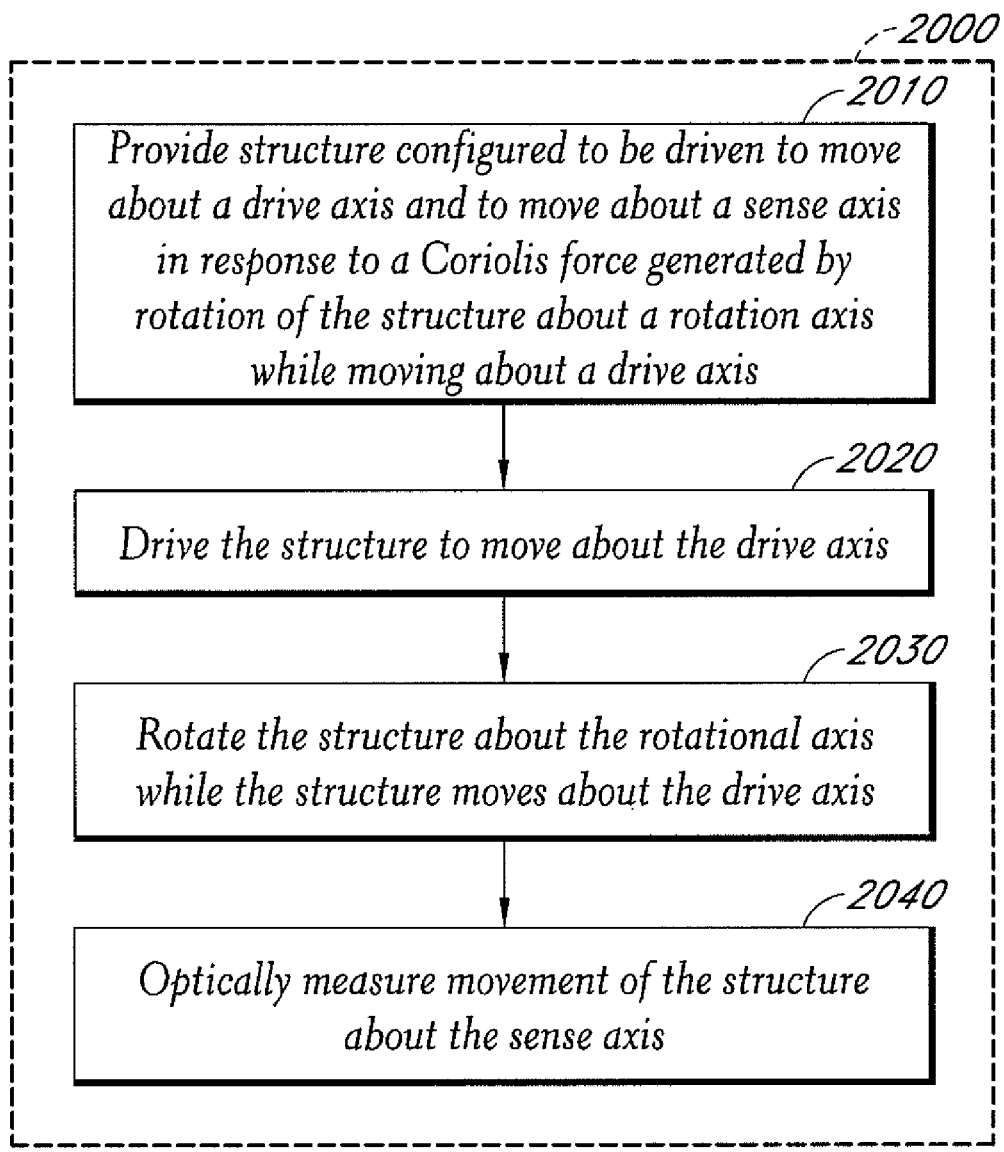
FIGS. 8-9 are flowcharts of example methods for detecting rotation in accordance with certain embodiments described herein.

FIG. 8 is a flowchart of an example method 2000 of detecting rotation in accordance with certain embodiments described herein. The method 2000 comprises providing a structure 100 configured to be driven to move about a drive axis 102 and to move about a sense axis 104 in response to a Coriolis force 1000 generated by rotation of the structure 100 about a rotational axis z while moving about the drive axis 102, as shown in operational block 2010 of FIG. 8. The method 2000 also comprises driving the structure 100 to move about the drive axis 102, as shown in operational block 2020; and rotating the structure 100 about the rotational axis z while the structure 100 moves about the drive axis 102, as shown in operational block 2030. The method 2000 further comprises optically measuring movement of the structure 100 about the sense axis 104, as shown in operational block 2040 of FIG. 8.

In certain embodiments, the method 2000 is compatible with various configurations of the gyroscope 10 described herein. For example, the method 2000 is compatible with a gyroscope 10 comprising a structure 100 which comprises a generally planar portion 105, at least one first torsional spring 110 extending generally along the drive axis 102 and operationally coupling the generally planar portion 105 to a support structure 300, and at least one second torsional spring 120 extending generally along the sense axis 104 and operationally coupling the generally planar portion 105 to the support structure 300.

In certain embodiments, the generally planar portion 105 comprises at least two drive arms 150, 160 extending in opposite directions from one another generally along the sense axis 104. The second torsional spring 120 operationally couples the two drive arms 150, 160 to the support structure 300.

In certain embodiments, the generally planar portion 105 comprises at least two sense arms 180, 190 extending in opposite directions from one another generally along the drive axis 102. The first torsional spring 110 operationally couples the two sense arms 180, 190 to the support structure 300.

In certain embodiments, the structure 100 comprises a post portion 310 extending generally perpendicularly away from the generally planar portion 105. In certain embodiments, the structure 100 (including one or more of the generally planar portion 105 and the post portion 310) is micromachined and comprises silicon, polysilicon, silica, or quartz. In certain embodiments, the post portion 310 comprises a short length (e.g., 10-20 millimeters) of a conventional optical fiber (e.g., with its jacket stripped off).

In certain embodiments, driving the structure 100 in the operational block 2020 comprises irradiating at least a portion 430 of the structure 100 with electromagnetic radiation having sufficient radiation pressure to drive the structure 100 to oscillate about the drive axis 102 (e.g., with an amplitude large enough to achieve a desired level of sensitivity of at least 0.0015 degree/hour, or across a range between 0.0015 degree/hour and 15 degrees/hour, or across a range between 0.0015 degree/hour and $1.296 \times 10^7$ degrees/hour). In certain other embodiments, driving the structure 100 in the operational block 2020 comprises applying sufficient electrostatic force on at least a portion 480 of the structure to drive the structure 100 to oscillate about the drive axis 102 (e.g., with an amplitude large enough to achieve a desired level of sensitivity).

Figure 9:
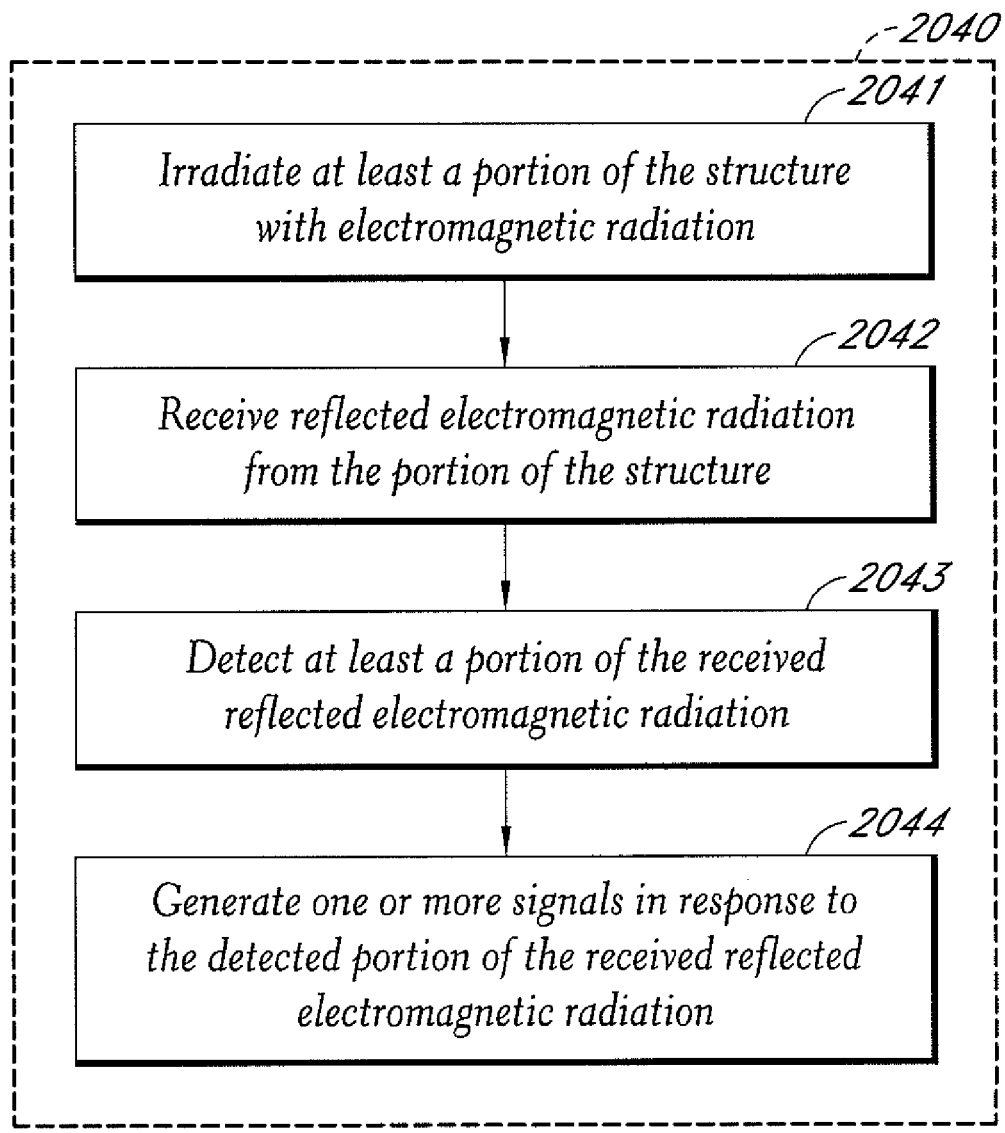

In certain embodiments, the drive axis 102 is substantially planar with and substantially perpendicular to the sense axis 104. In addition, in certain embodiments, the rotational axis z is substantially perpendicular to at least one of the drive axis 102 and the sense axis 104. In certain embodiments, optically measuring movement in the operational block 2040 comprises irradiating at least a portion 630 of the structure 100 with electromagnetic radiation, as shown in operational block 2041 in FIG. 9, and receiving reflected electromagnetic radiation from the portion 630 of the structure 100, as shown in operational block 2042 in FIG. 9. In certain embodiments, optically measuring movement in the operational block 2040 further comprises detecting at least a portion of the received reflected electromagnetic radiation as shown in operational block 2043 in FIG. 9, and generating one or more signals in response to the detected portion of the received reflected electromagnetic radiation, as shown in operational block 2044 in FIG. 9.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A gyroscope comprising:
   a structure configured to be driven to move about a drive axis, the structure further configured to move about a sense axis in response to a Coriolis force generated by rotation of the structure about a rotational axis while moving about the drive axis; and
   an optical sensor system configured to optically measure movement of the structure about the sense axis, wherein the optical sensor system is configured to irradiate at least a portion of the structure with electromagnetic radiation in a direction of the movement about the sense axis and to receive reflected electromagnetic radiation from the portion of the structure to optically measure the movement of the structure about the sense axis.

2. The gyro scope of claim 1, wherein the gyro scope is a microelectromechanical system (MEMS) gyroscope.

3. The gyroscope of claim 1, wherein the structure comprises a generally planar portion, at least one first torsional spring extending generally along the drive axis and operationally coupling the generally planar portion to a support structure, and at least one second torsional spring extending generally along the sense axis and operationally coupling the generally planar portion to the support structure.

4. The gyroscope of claim 3, wherein the generally planar portion comprises at least two drive arms extending in opposite directions from one another generally along the sense axis, wherein the at least second drive torsional spring operationally couples the at least two drive arms to the support structure.

5. The gyroscope of claim 3, wherein the generally planar portion comprises at least two sense arms extending in opposite directions from one another generally along the drive axis, wherein the at least one first torsional spring operationally couples the at least two sense arms to the support structure.

6. The gyroscope of claim 3, wherein the structure comprises a post portion extending generally perpendicularly away from the generally planar portion.

7. The gyroscope of claim 1, wherein the rotational axis is substantially perpendicular to at least one of the drive axis and the sense axis.

8. The gyroscope of claim 1, wherein the optical sensor system comprises one or more optical fibers configured to irradiate the at least a portion of the structure with the electromagnetic radiation and to receive the reflected electromagnetic radiation from the portion of the structure.

9. The gyroscope of claim 8, wherein the one or more optical fibers and the portion of the structure form at least one Fabry-Perot cavity therebetween.

10. The gyroscope of claim 8, wherein the optical sensor system further comprises one or more optical detectors in optical communication with the one or more optical fibers, the one or more optical detectors configured to receive the electromagnetic radiation reflected from the portion of the structure and transmitted by the one or more optical fibers and to generate one or more signals in response to the received electromagnetic radiation.

11. The gyroscope of claim 8, wherein the portion of the structure comprises one or more photonic-crystal structures.

12. The gyroscope of claim 1, further comprising a drive system configured to drive the structure to oscillate about the drive axis.

13. The gyroscope of claim 12, wherein the drive system comprises one or more optical fibers configured to irradiate at least a portion of the structure with electromagnetic radiation having sufficient radiation pressure to drive the structure to oscillate about the drive axis.

14. The gyroscope of claim 13, wherein the one or more optical fibers and the portion of the structure form at least one Fabry-Perot cavity therebetween.

15. The gyroscope of claim 12, wherein the drive system comprises one or more electrodes configured to apply sufficient electrostatic force on at least a portion of the structure to drive the structure to oscillate about the drive axis.

16. A method of detecting rotation, the method comprising:
providing a structure configured to be driven to move about a drive axis and to move about a sense axis in response to a Coriolis force generated by rotation of the structure about a rotational axis while moving about the drive axis;
driving the structure to move about the drive axis;
rotating the structure about the rotational axis while the structure moves about the drive axis; and
optically measuring movement of the structure about the sense axis, wherein optically measuring movement of the structure comprises irradiating at least a portion of the structure with electromagnetic radiation in a direction of the movement about the sense axis and receiving reflected electromagnetic radiation from the portion of the structure.

17. The method of claim 16, wherein the structure comprises a generally planar portion, at least one first torsional spring extending generally along the drive axis and operationally coupling the generally planar portion to a support structure, and at least one second torsional spring extending generally along the sense axis and operationally coupling the generally planar portion to the support structure.

18. The method of claim 17, wherein the generally planar portion comprises at least two drive arms extending in opposite directions from one another generally along the sense axis, wherein the at least one second torsional spring operationally couples the at least two drive arms to the support structure.

19. The method of claim 17, wherein the generally planar portion comprises at least two sense arms extending in opposite directions from one another generally along the drive axis, wherein the at least one first torsional spring operationally couples the at least two sense arms to the support structure.

20. The method of claim 17, wherein the structure comprises a post portion extending generally perpendicularly away from the generally planar portion.

21. The method of claim 16, wherein the structure is micromachined and comprises silicon, polysilicon, silica, or quartz.

22. The method of claim 16, wherein driving the structure comprises irradiating at least a portion of the structure with electromagnetic radiation having sufficient radiation pressure to drive the structure to oscillate about the drive axis.

23. The method of claim 16, wherein driving the structure comprises applying sufficient electrostatic force on at least a portion of the structure to drive the structure to oscillate about the drive axis.

24. The method of claim 16, wherein optically measuring movement of the structure further comprises detecting at least a portion of the received reflected electromagnetic radiation and generating one or more signals in response to the detected portion of the received reflected electromagnetic radiation.

25. A method of fabricating a gyroscope, the method comprising:
providing a structure configured to be driven to move about a drive axis, the structure further configured to move about a sense axis in response to a Coriolis force generated by rotation of the structure about a rotational axis while moving about the drive axis; and
providing an optical sensor system configured to optically measure movement of the structure about the sense axis, wherein the optical sensor system is configured to irradiate at least a portion of the structure with electromagnetic radiation in a direction of the movement about the sense axis and to receive reflected electromagnetic radiation from the portion of the structure to optically measure the movement of the structure about the sense axis.

26. The method of claim 25, further comprising:
operationally coupling a generally planar portion of the structure to a support structure by at least one first torsional spring extending generally along the drive axis; and
operationally coupling the generally planar portion of the structure to the support structure by at least one second torsional spring extending generally along the sense axis.

27. The method of claim 26, wherein the generally planar portion comprises at least two drive arms extending in opposite directions from one another generally along the sense axis, wherein the at least second drive torsional spring operationally couples the at least two drive arms to the support structure.

28. The method of claim 26, wherein the generally planar portion comprises at least two sense arms extending in opposite directions from one another generally along the drive axis, wherein the at least one first torsional spring operationally couples the at least two sense arms to the support structure.

29. The method of claim 25, wherein providing the optical sensor system comprises providing one or more optical fibers configured to irradiate the at least a portion of the structure with the electromagnetic radiation and to receive the reflected electromagnetic radiation from the portion of the structure.

30. The method of claim 29, wherein providing the optical sensor system comprises forming at least one Fabry-Perot cavity between the one or more optical fibers and the portion of the structure.

31. The method of claim 29, wherein providing the optical sensor system further comprises providing one or more optical detectors in optical communication with the one or more optical fibers, the one or more optical detectors configured to receive the electromagnetic radiation reflected from the portion of the structure and transmitted by the one or more optical fibers and to generate one or more signals in response to the received electromagnetic radiation.

32. The method of claim 25, further comprising providing a drive system configured to drive the structure to oscillate about the drive axis.

33. The method of claim 32, wherein providing the drive system comprises providing one or more optical fibers configured to irradiate at least a portion of the structure with electromagnetic radiation having sufficient radiation pressure to drive the structure to oscillate about the drive axis.

34. The method of claim 33, wherein providing the drive system comprises forming at least one Fabry-Perot cavity between the one or more optical fibers and the portion of the structure.

35. The method of claim 32, wherein providing the drive system comprises providing one or more electrodes configured to apply sufficient electrostatic force on at least a portion of the structure to drive the structure to oscillate about the drive axis.

36. The method of claim 25, further comprising centering a post portion extending generally perpendicularly away from the generally planar portion.

37. The method of claim 36, wherein centering the post portion comprises:
  placing a sensor on the sense axis,
  measuring a first noise spectrum having a first peak at a resonance frequency of a sense mode,
  placing the sensor on the drive axis,
  measuring a second noise spectrum having second peak at a resonance frequency of a drive mode, and
  determining a position of the post portion on the structure where the first and second peaks are reduced.

* * * * *

UNITED STATES PATENT AND TRADEMARK OFFICE
CERTIFICATE OF CORRECTION

PATENT NO. : 8,269,976 B2
APPLICATION NO. : 12/770545
DATED : September 18, 2012
INVENTOR(S) : Kilic et al.

Page 1 of 1

It is certified that error appears in the above-identified patent and that said Letters Patent is hereby corrected as shown below:

In column 14, lines 33-35, change " $\phi_0 = \theta_0 \frac{2f}{K_\phi} \Omega\omega \frac{\omega_\phi^2}{\sqrt{(\omega^2 - \omega_\phi^2)^2 + \omega_\phi^2/Q_\phi^2}}$ " to -- $\phi_0 = \theta_0 \frac{2f}{K_\phi} \Omega\omega \frac{\omega_\phi^2}{\sqrt{(\omega^2 - \omega_\phi^2)^2 + \omega^2\omega_\phi^2/Q_\phi^2}}$ --.

In column 16, line 10, change "minor" to --mirror--.

In column 16, line 13, change "minor" to --mirror--.

In column 16, line 16, change "minor" to --mirror--.

In column 17, line 50, change "and of" to --and--.

In column 17, line 53, change "$\Omega_0$" to --$\Omega_{min}$--.

Signed and Sealed this
Twelfth Day of March, 2013

Teresa Stanek Rea
*Acting Director of the United States Patent and Trademark Office*